United States Patent
Studley et al.

(10) Patent No.: US 10,011,080 B2
(45) Date of Patent: Jul. 3, 2018

(54) COMPOSITE PART FORMING SYSTEM

(71) Applicant: The Boeing Company, Chicago, IL (US)

(72) Inventors: Silas Lawton Studley, Seattle, WA (US); Matthew Ray DesJardien, Kenmore, WA (US); James N. Buttrick, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 741 days.

(21) Appl. No.: 14/500,667

(22) Filed: Sep. 29, 2014

(65) Prior Publication Data

US 2016/0089841 A1    Mar. 31, 2016

(51) Int. Cl.
  *B32B 41/00*  (2006.01)
  *B29C 70/38*  (2006.01)
  *B29K 105/08*  (2006.01)
  *B29L 31/30*  (2006.01)

(52) U.S. Cl.
  CPC ...... *B29C 70/38* (2013.01); *B29K 2105/0872* (2013.01); *B29L 2031/3076* (2013.01)

(58) Field of Classification Search
  CPC ............ B29C 70/38; B29L 2031/3076; B29K 2105/0872
  See application file for complete search history.

(56) References Cited

U.S. PATENT DOCUMENTS

| | | | |
|---|---|---|---|
| 4,475,976 A | 10/1984 | Mittelstadt et al. | |
| 4,980,013 A | 12/1990 | Lowery | |
| 5,464,341 A | 11/1995 | Tachibana et al. | |
| 6,495,086 B1 | 12/2002 | Uytterhaeghe et al. | |
| 7,118,370 B2 | 10/2006 | Willden et al. | |
| 7,527,759 B2 | 5/2009 | Lee et al. | |
| 8,118,959 B2 | 2/2012 | Nelson et al. | |

(Continued)

FOREIGN PATENT DOCUMENTS

| | | |
|---|---|---|
| EP | 0079735 A2 | 5/1983 |
| WO | WO2005011961 A1 | 2/2005 |

(Continued)

OTHER PUBLICATIONS

United Kingdom Intellectual Property Office Examination Report, dated Feb. 19, 2016, regarding Application No. GB1515641.7, 5 pages.

*Primary Examiner* — Galen H Hauth
(74) *Attorney, Agent, or Firm* — Yee & Associates, P.C.

(57) ABSTRACT

A system and method for forming a composite part. The method comprises positioning a prepreg material relative to a composite forming tool. The composite forming tool comprises a frame associated with a shaping system, a base comprising at least one mold, and the shaping system associated with the frame and configured to move relative to the frame, the base, and the prepreg material. The method also lowers the shaping system of the composite forming tool towards the prepreg material. The method applies pressure to the prepreg material with a centerline presser of the shaping system. The method also applies a force to the prepreg material using a number of compliant elongate members of the shaping system to uniformly apply the prepreg material to the at least one mold of the base of the composite forming tool.

20 Claims, 22 Drawing Sheets

(56) References Cited

U.S. PATENT DOCUMENTS

| | | | |
|---|---|---|---|
| 8,597,015 B2 | 12/2013 | Henderson | |
| 2011/0297303 A1* | 12/2011 | Borsting | B29C 70/38 |
| | | | 156/212 |
| 2012/0128810 A1* | 5/2012 | Arriola Arrizabalaga | B29C 70/38 |
| | | | 425/90 |
| 2012/0186730 A1* | 7/2012 | Shindo | B29C 70/38 |
| | | | 156/160 |
| 2012/0298309 A1* | 11/2012 | Arakawa | B29C 70/388 |
| | | | 156/538 |
| 2014/0103585 A1 | 4/2014 | Coxon et al. | |
| 2014/0215783 A1* | 8/2014 | Bech | B29C 33/26 |
| | | | 29/23.51 |

FOREIGN PATENT DOCUMENTS

| | | |
|---|---|---|
| WO | WO2009073297 A2 | 6/2009 |
| WO | WO2014025333 A1 | 2/2014 |

* cited by examiner

COMPOSITE PART FORMING SYSTEM

BACKGROUND INFORMATION

1. Field

The present disclosure relates generally to manufacturing composite structures. More particularly, the present disclosure relates to a method and apparatus for laying up a number of plies of composite material on a number of molds.

2. Background

Aircraft are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

Composite materials are tough, lightweight materials created by combining two or more functional components. For example, a composite material may include reinforcing fibers bound in polymer resin matrix. The fibers may be unidirectional or may take the form of a woven cloth or fabric.

In manufacturing composite parts, layers of composite material are typically laid up on a tool. The layers may be comprised of fibers in sheets. These sheets may take the form of fabrics, tape, tows, or other suitable forms. In some cases, resin may be infused or preimpregnated into the sheets. These types of sheets are commonly referred to as prepreg.

There are currently several techniques for laying up and compacting composite prepreg plies on a tool. Composite plies may be laid up using automated fiber placement machines or tape laminating machines, but these machines are large, expensive and require intricate programming and significant validation. Further, these machines progressively lay-up plies using tape or fiber with a smaller width than the completed ply. In other words, automated fiber placement machines or tape laminating machines lay up individual tape or fiber portions to form a ply. Currently, laying up whole prepreg sheets or plies is accomplished by hand layup. Hand layup of plies is possible, but time-consuming, labor intensive, and may be inaccurate and/or inconsistent.

Accordingly, there is a need for a method and apparatus that automates the process of laying up composite plies. There is also a need for a method and apparatus of the type mentioned above that minimizes or eliminates the need for human intervention and supervision, while providing consistent and accurate ply placement.

Therefore, it would be desirable to have a method and apparatus that take into account at least some of the issues discussed above, as well as other possible issues. For example, it would be desirable to have a method and apparatus that take into account technical problems that occur with at least one of the manual layup of composite parts or currently used composite part layup systems.

SUMMARY

An illustrative embodiment of the present disclosure provides a method for forming a composite part. The method comprises positioning a prepreg material relative to a composite forming tool. The composite forming tool comprises a frame associated with a shaping system, a base comprising at least one mold, and the shaping system associated with the frame and configured to move relative to the frame, the base, and the prepreg material. The method also lowers the shaping system of the composite forming tool towards the prepreg material. The method applies pressure to the prepreg material with a centerline presser of the shaping system. The method also applies a force to the prepreg material using a number of compliant elongate members of the shaping system to uniformly apply the prepreg material to the at least one mold of the base of the composite forming tool.

A further illustrative embodiment of the present disclosure provides an apparatus. The apparatus comprises a base, a frame, and a shaping system. The base comprises at least one mold. The frame positions the shaping system relative to the base. The shaping system is associated with the frame. The shaping system moves relative to the frame, the base, and a prepreg material positioned relative to the base. The shaping system comprises a centerline presser and a number of compliant elongate members. The centerline presser moves relative to the prepreg material along a vertical axis to apply pressure to the prepreg material. The number of compliant elongate members moves relative to the centerline presser and the prepreg material and applies controlled force to the prepreg material to uniformly apply the prepreg material to the at least one mold.

Another illustrative embodiment of the present disclosure provides another method for forming a composite part. The method comprises positioning a prepreg material on a carrier relative to a composite forming tool. The composite forming tool comprises a frame associated with a shaping system, a base comprising at least one mold, and the shaping system associated with the frame and configured to move relative to the frame, the base, and the carrier. The method also lowers the shaping system of the composite forming tool towards the prepreg material. The method contacts the carrier with a centerline presser of the shaping system. The method also uniformly applies the prepreg material to the at least one mold of the base of the composite forming tool using a number of compliant elongate members of the shaping system. Uniformly applying the prepreg material comprises moving the number of compliant elongate members of the shaping system relative to the prepreg material along a horizontal axis using a number of actuators connected to the centerline presser, and applying a force to the prepreg material using the number of compliant elongate members of the shaping system, wherein the force is approximately normal to a surface of the at least one mold of the base.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
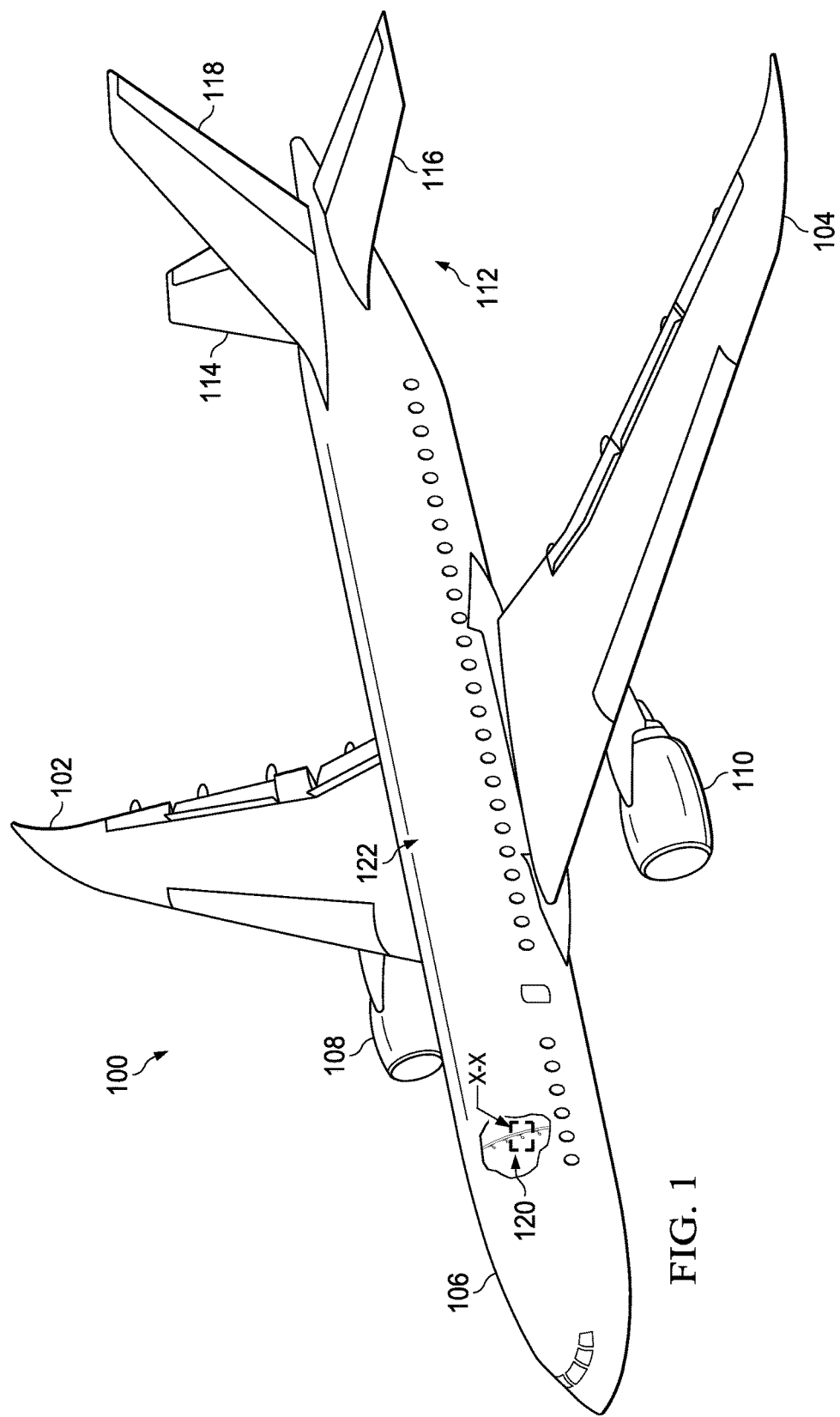
FIG. 1 is an illustration of an aircraft in accordance with an illustrative embodiment.

The illustrative embodiments recognize and take into account one or more different considerations. The illustrative embodiments recognize and take into account that laying up composite parts by hand is at least one of undesirably slow, undesirably expensive, prone to inconsistencies, or inaccurate.

The illustrative embodiments also recognize and take into account that manufacturing space has a cost. The illustrative embodiments further recognize and take into account that undesirably large machinery may take up a large amount of valuable and expensive manufacturing space. Accordingly, the illustrative embodiments recognize and take into account that minimizing the size of composite manufacturing equipment may be desirable.

Further, the illustrative embodiments recognize and take into account that female composite parts laid up on a male tool may require an extra handling step to remove the female composite part before the female composite part can be cured. This extra handling step may increase at least one of manufacturing time, manufacturing cost, or inconsistencies in the resulting female composite part. Yet further, the illustrative embodiments recognize and take into account that forming a female composite part on a male tool uses the inner mold line to be the defining characteristic. As a result, forming a female composite part on a male tool may result in undesirable quality on the exterior of the female part. Thus, the illustrative embodiments recognize and take into account that forming a female composite part on a female mold is desirable.

The illustrative embodiments recognize and take into account that conventional composite manufacturing equipment cannot produce female composite parts having desirable quality using female molds. Conventional composite manufacturing equipment forming female composite parts on female molds results in composite parts with wrinkles, voids, tears, undesirable shapes, or other inconsistencies.

The illustrative embodiments further take into account that a finished layup may have an expected "bulk factor." A "bulk factor" is the difference in volume between the part as it has been laid up and a theoretical part formed from the composite material. If this "bulk factor" varies undesirably across the uncured or unconsolidated part, it may cause inconsistencies. For example, undesirable variation in the "bulk factor" may distort the final cured part.

Inconsistencies such as an inconsistent bulk factor, wrinkles, voids, tears, undesirable shapes, or other inconsistencies may increase manufacturing cost by increasing discarded parts or by increasing the number of reworks. Inconsistencies such as an inconsistent bulk factor, wrinkles, voids, tears, undesirable shapes, or other inconsistencies may increase manufacturing time as a result of reworking or creating new parts after discarding parts of undesirable quality.

Yet further, the illustrative embodiments recognize and take into account that composite forming equipment which forms composite parts having a variety of shapes may be desirable. Additionally, the illustrative embodiments recognize and take into account that composite forming equipment which forms composite parts of different shapes may reduce manufacturing costs.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which a composite part may be implemented in accordance with an illustrative embodiment. For example, the composite part may take the form of stiffeners 120 associated with composite skin 122 of aircraft 100. FIG. 1 depicts an exposed view of stiffeners 120. Although not depicted, in some illustrative examples, stiffeners 120 may also be associated with one of wing 102, wing 104, horizontal stabilizer 114, horizontal stabilizer 116, or vertical stabilizer 118.

The illustration of aircraft 100 is provided for purposes of illustrating one environment in which the different illustrative embodiments may be implemented. The illustration of aircraft 100 in FIG. 1 is not meant to imply physical or architectural limitations to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable types of aircraft.

Figure 2:
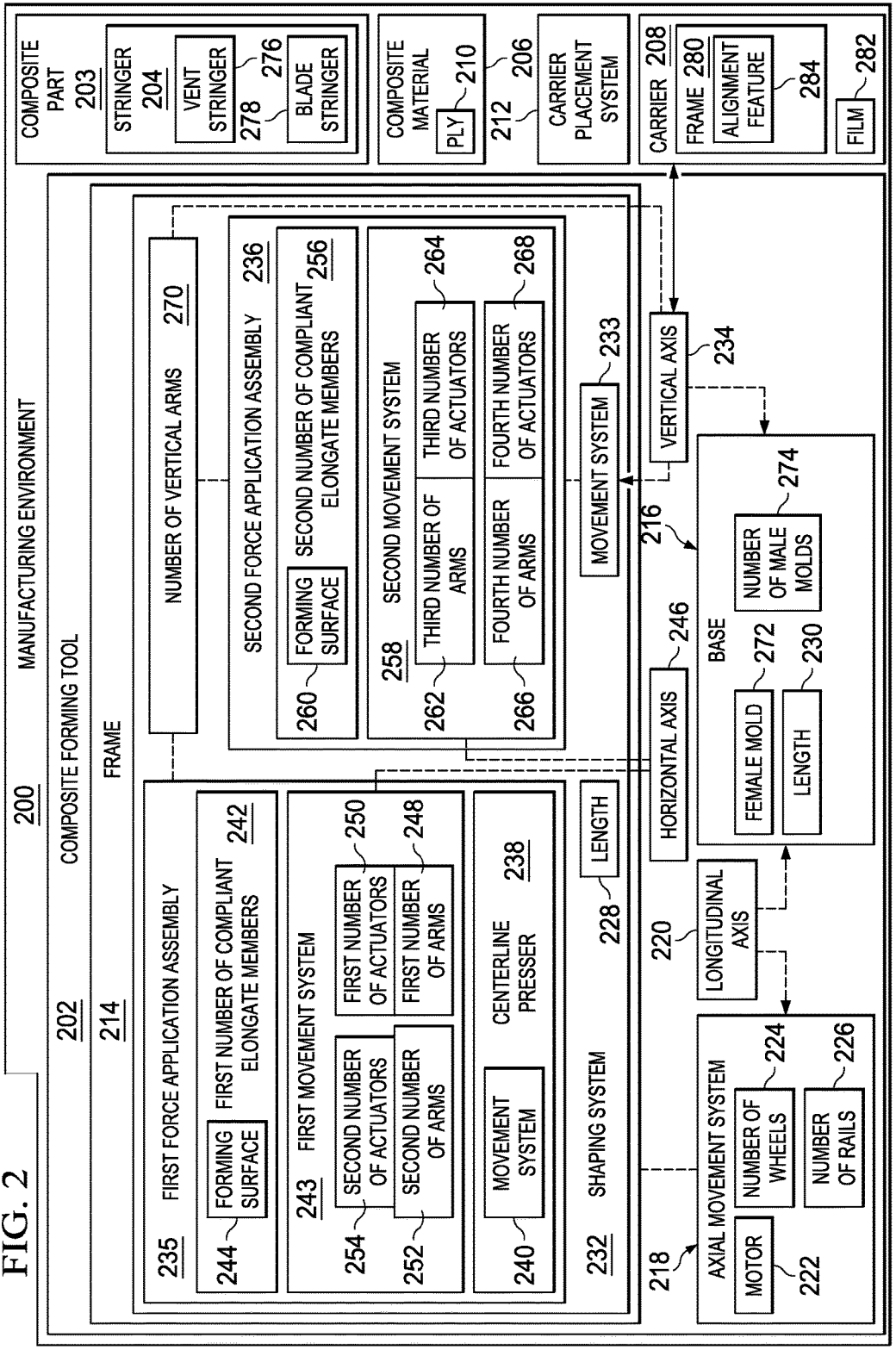
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Composite parts such as stiffeners 120 of FIG. 1 may be manufactured in manufacturing environment 200. Manufacturing environment 200 may be used to form a variety of composite parts.

Manufacturing environment 200 has composite forming tool 202. Composite forming tool 202 may form composite part 203. Composite part 203 may take the form of stringer 204. Composite forming tool 202 forms composite part 203, such as stringer 204, from composite material 206. Carrier 208 carrying ply 210 of composite material 206 may be placed into composite forming tool 202 by carrier placement system 212. Carrier placement system 212 may move carrier 208 so that it is positioned between frame 214 and base 216 of composite forming tool 202.

Composite forming tool 202 includes frame 214, base 216, and axial movement system 218. Axial movement system 218 moves one of frame 214 and base 216 relative to the other along longitudinal axis 220 of composite forming tool 202. Axial movement system 218 may include motor 222 to facilitate movement of one of frame 214 and base 216 relative to the other. Axial movement system 218 may include at least one of number of wheels 224 and number of rails 226.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination of items and number of items may be used from the list but not all of the items in the list are required.

In some examples, number of wheels 224 may be associated with frame 214. In these examples, frame 214 may roll along longitudinal axis 220 relative to base 216. Frame 214 may move relative to base 216 to place composite material 206 on another section of base 216. Specifically, length 228 of frame 214 may be less than length 230 of base 216. Thus, to apply composite material 206 along length 230 of base 216, frame 214 must apply composite material 206 incrementally along length 230. Accordingly, frame 214 translates along longitudinal axis 220 to apply composite material 206 along length 230 of base 216.

In some examples, number of rails 226 may be associated with at least one of frame 214 or base 216. In these examples, one of frame 214 or base 216 moves along longitudinal axis 220 relative to the other along number of rails 226. One of frame 214 or base 216 may move relative to the other along longitudinal axis 220 on number of rails 226 to apply composite material 206 along length 230 of base 216.

Frame 214 is associated with shaping system 232 and movement system 233. Frame 214 positions shaping system 232 relative to base 216. Specifically, positioning frame 214 relative to base 216 along longitudinal axis 220 may also position shaping system 232 relative to base 216. Movement system 233 moves shaping system 232 along vertical axis 234 relative to base 216. Movement system 233 may move shaping system 232 along vertical axis 234 such that shaping system 232 may act upon composite material 206. In some illustrative examples, movement system 233 may include an actuator. In these illustrative examples, movement system 233 may control the force applied by shaping system 232 using the actuator.

Shaping system 232 applies a force to composite material 206 to uniformly apply composite material 206 to base 216. A material is uniformly applied when substantially all of a surface of the material contacts the surface of base 216. Further, a material is "uniformly applied" when the material is subjected to a known and repeatable force, over the entirety of the area of the material. The applied force would be desirably applied such that inconsistencies are minimized in composite material 206. Examples of inconsistencies may include at least one of generating wrinkles, tears, over-compacted areas, under-compacted areas, bubbles, fiber distortions, or other undesirable features.

Uniform application may be force, time, and heat dependent. Shaping system 232 includes first force application assembly 235, second force application assembly 236, and centerline presser 238. Centerline presser 238 is associated with movement system 240. Movement system 240 may move centerline presser 238 along vertical axis 234 relative to first force application assembly 235 and second force application assembly 236. Further, movement system 240 may move centerline presser 238 along vertical axis 234 relative to frame 214 and base 216. Centerline presser 238 may apply pressure to at least one of composite material 206 or carrier 208 prior to uniformly applying composite material 206 to base 216.

First force application assembly 235 has first number of compliant elongate members 242 and first movement system 243. First number of compliant elongate members 242 may be one or more compliant elongate members. In illustrative examples in which first number of compliant elongate members 242 is more than one compliant elongate member, each of the compliant elongate members is connected together to form a single forming surface. First number of compliant elongate members 242 has forming surface 244 which impacts at least one of composite material 206 or carrier 208. First movement system 243 may move first number of compliant elongate members 242 relative to frame 214, base 216, and centerline presser 238 to uniformly apply composite material 206 to base 216. Specifically, first movement system 243 may move first number of compliant elongate members 242 along horizontal axis 246 relative to base 216. First number of compliant elongate members 242 contacts centerline presser 238 in a resting position. First movement system 243 may move first number of compliant elongate members 242 in a sweeping motion away from centerline presser 238 along horizontal axis 246. First movement system 243 may also adjust an angle of first number of compliant elongate members 242 relative to base 216. First movement system 243 may control a position and an angle of first number of compliant elongate members 242. Movement system 233 may control the force applied by a compliant elongate member in first number of compliant elongate members 242 using an actuator.

First movement system 243 includes first number of arms 248, first number of actuators 250, second number of arms 252, and second number of actuators 254. First number of actuators 250 may be attached at the end of first number of arms 248. First number of arms 248 may be directly connected to centerline presser 238 such that centerline presser 238 acts as a strongback. A strongback acts as a support structure. In this example, centerline presser 238 acts as a support structure, or spine, being used for its rigidity. Forces imparted to first number of compliant elongate members 242 may be reacted through centerline presser 238. These forces may be reacted through centerline presser 238 due to the rigidity of centerline presser 238. Further, these forces may be reacted through centerline presser 238 due to the connection of first number of arms 248 to centerline presser 238. First number of actuators 250 may extend through centerline presser 238. First number of actuators 250 may be directly connected to first number of compliant elongate members 242. First number of actuators 250 may move a compliant elongate member of first number of compliant elongate members 242 relative to centerline presser 238.

Second number of actuators 254 may be attached at the end of second number of arms 252. Second number of arms 252 may be directly connected to centerline presser 238 such that centerline presser 238 acts as a strongback. The forces imparted to first number of compliant elongate members 242 may be reacted through centerline presser 238 due to the rigidity of centerline presser 238. These forces may be reacted through centerline presser 238 due to the connection of second number of arms 252 to centerline presser 238. Second number of actuators 254 may extend through centerline presser 238. Second number of actuators 254 may be directly connected to first number of compliant elongate members 242. First movement system 243 may control a position and an angle of first number of compliant elongate members 242 using at least one of first number of actuators 250 and second number of actuators 254. In some illustrative examples, a number of first number of actuators 250 may move a first compliant elongate member of first number of compliant elongate members 242 relative to centerline presser 238.

Second force application assembly 236 has second number of compliant elongate members 256 and second movement system 258. Second number of compliant elongate members 256 may be one or more compliant elongate members. In illustrative examples in which second number of compliant elongate members 256 is more than one compliant elongate member, each of the compliant elongate members is connected together to form a single forming surface. Second number of compliant elongate members 256 has forming surface 260 which impacts at least one of composite material 206 or carrier 208. Second movement system 258 may move second number of compliant elongate members 256 relative to frame 214, base 216, and centerline presser 238 to apply composite material 206 to base 216. Specifically, second movement system 258 may move second number of compliant elongate members 256 along horizontal axis 246 relative to base 216. Second number of compliant elongate members 256 contacts centerline presser 238 in a resting position. Second movement system 258 may move second number of compliant elongate members 256 in a sweeping motion away from centerline presser 238 along horizontal axis 246. Second movement system 258 may also adjust an angle of second number of compliant elongate members 256 relative to base 216. Second movement system 258 may control a position and an angle of second number of compliant elongate members 256. Movement system 233 may control the force applied by a compliant elongate member in second number of compliant elongate members 256 using an actuator.

Second movement system 258 includes third number of arms 262, third number of actuators 264, fourth number of arms 266, and fourth number of actuators 268. Third number of actuators 264 may be attached at the end of third number of arms 262. Third number of arms 262 may be directly connected to centerline presser 238 such that centerline presser 238 acts as a strongback. Forces imparted to second number of compliant elongate members 256 may be reacted through centerline presser 238. These forces may be reacted through centerline presser 238 due to the rigidity of centerline presser 238. Further, these forces may be reacted through centerline presser 238 due to the connection of third number of arms 262 to centerline presser 238. Third number of actuators 264 may extend through centerline presser 238. Third number of actuators 264 may be directly connected to second number of compliant elongate members 256.

Fourth number of actuators 268 may be attached at the end of fourth number of arms 266. Fourth number of arms 266 may be directly connected to centerline presser 238 such that centerline presser 238 acts as a strongback. The forces imparted to second number of compliant elongate members 256 may be reacted through centerline presser 238 due to the rigidity of centerline presser 238. These forces may be reacted through centerline presser 238 due to the connection of fourth number of arms 266 to centerline presser 238. Fourth number of actuators 268 may extend through centerline presser 238. Fourth number of actuators 268 may be directly connected to second number of compliant elongate members 256. Second movement system 258 may control a position and an angle of second number of compliant elongate members 256 using at least one of third number of actuators 264 and fourth number of actuators 268.

Number of vertical arms 270 is associated with first force application assembly 235 and second force application assembly 236. For example, number of vertical arms 270 may be connected to first force application assembly 235 and second force application assembly 236 through a plate. Number of vertical arms 270 may move first number of compliant elongate members 242 and second number of compliant elongate members 256 along vertical axis 234. Number of vertical arms 270 may facilitate first number of compliant elongate members 242 and second number of compliant elongate members 256 applying force to composite material 206.

Number of vertical arms 270 and first movement system 243 may direct first number of compliant elongate members 242 such that forming surface 244 follows the surface of base 216 to uniformly apply composite material 206 to base 216. Number of vertical arms 270 and second movement system 258 may direct second number of compliant elongate members 256 such that forming surface 260 follows the surface of base 216 to uniformly apply composite material 206 to base 216. The interaction of number of vertical arms 270, first movement system 243, and second movement system 258 move forming surface 244 and forming surface 260 to apply a desired amount of force to composite material 206.

Number of vertical arms 270, first movement system 243, and second movement system 258 may direct first number of compliant elongate members 242 and second number of compliant elongate members 256 such that forming surface 244 and forming surface 260, respectively, move in a sweeping motion away from centerline presser 238. The connections between first movement system 243 and second movement system 258 may facilitate application of a desired force to composite material 206 by first number of compliant elongate members 242 and second number of compliant elongate members 256 during shaping of composite material 206 onto base 216.

Base 216 may take the form of at least one mold. In one illustrative example, base 216 is female mold 272. In another illustrative example, base 216 is number of male molds 274. In some illustrative examples, number of male molds 274 is two male molds. When base 216 is number of male molds 274, number of male molds 274 may be horizontally movable relative to each other.

Female mold 272 may be used to form vent stringer 276. Vent stringer 276 may be formed by uniformly applying composite material 206 to female mold 272 using shaping system 232. Number of male molds 274 may be used to form blade stringer 278. Blade stringer 278 may be formed using two steps. First, composite material 206 is uniformly applied to number of male molds 274 using shaping system 232. Afterwards, a first male mold and a second male mold of number of male molds 274 may be moved towards each other.

Prior to shaping, composite material 206 may be positioned within composite forming tool 202 using carrier 208. Carrier 208 includes frame 280 and film 282. Composite material 206 contacts film 282 of carrier 208. In other words, film 282 carries composite material 206. Film 282 is held taught by frame 280.

Frame 280 may be a rigid structure used for positioning carrier 208 relative to composite forming tool 202. Frame 280 includes alignment feature 284. Alignment feature 284 is used to align composite material 206 relative to shaping system 232 and base 216. In some illustrative examples, alignment feature 284 may index frame 280 relative to a centerline of composite forming tool 202. When carrier 208 carries composite material 206, centerline presser 238, forming surface 244, and forming surface 260 contact film 282.

In some illustrative examples, composite material 206 may be positioned relative to shaping system 232 and base 216 without carrier 208. In these illustrative examples, centerline presser 238, forming surface 244, and forming surface 260 contact composite material 206.

Thus, one or more illustrative examples provide a technical solution to the technical issues associated with at least one of manual layup of composite parts or currently used composite part layup systems. The technical solution provides a uniform force capable of applying a composite material ply to a female mold.

Figure 3:
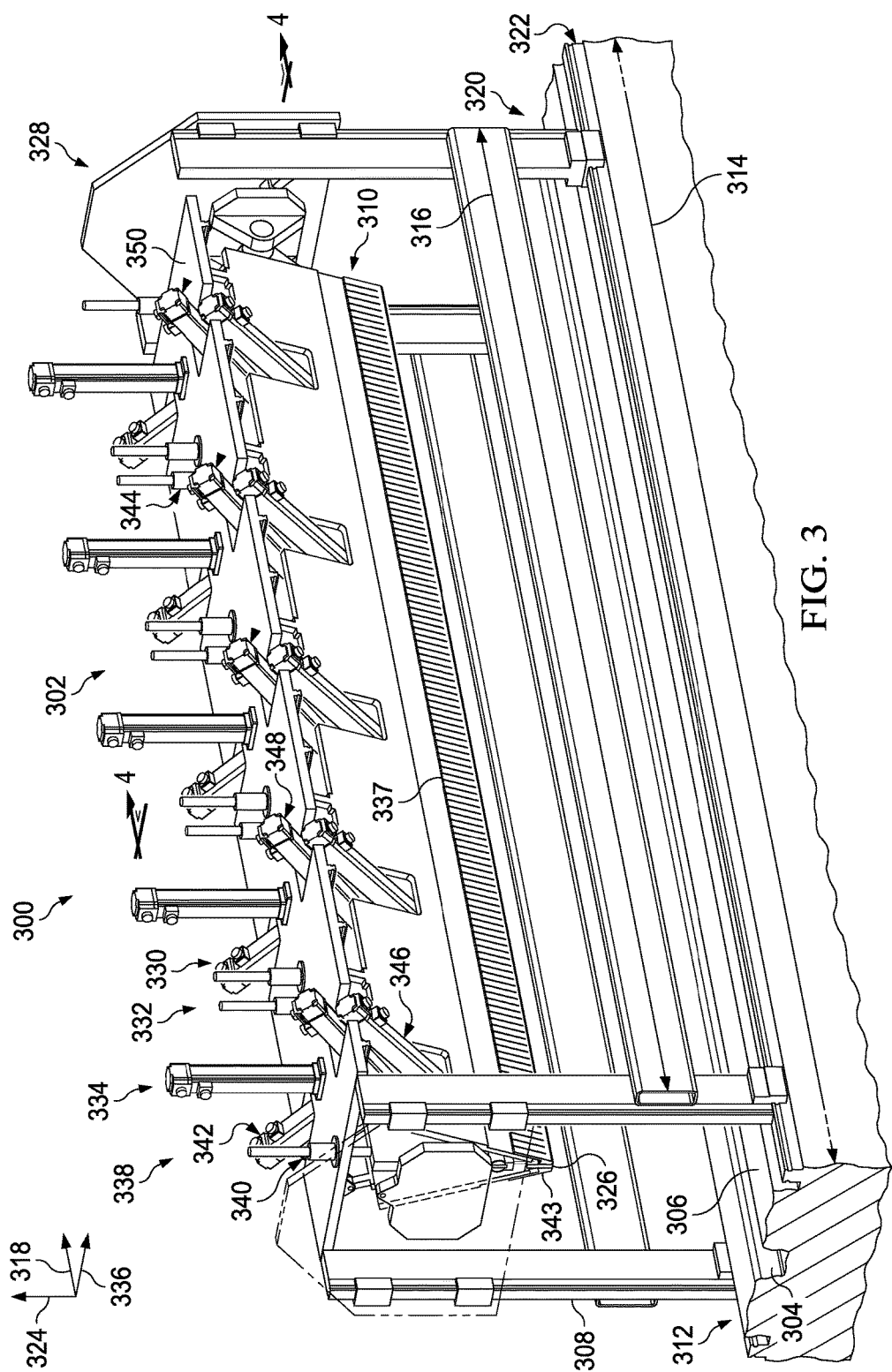
FIG. 3 is an illustration of a physical implementation of a manufacturing environment in accordance with an illustrative embodiment.

Turning now to FIG. 3, an illustration of a physical implementation of a manufacturing environment is depicted in accordance with an illustrative embodiment. Manufacturing environment 300 may be a physical implementation of manufacturing environment 200 of FIG. 2.

Manufacturing environment 300 includes composite forming tool 302 and composite material 304. Composite forming tool 302 includes base 306, frame 308, and shaping system 310. As depicted, base 306 is female mold 312. Length 314 of female mold 312 extends past the edges of the illustration. Length 316 of shaping system 310 is less than length 314 of female mold 312. To apply composite material 304 to length 314 of female mold 312, frame 308 and associated shaping system 310 are translated along longitudinal axis 318 of female mold 312.

Frame 308 translates along longitudinal axis 318 using axial movement system 320. In this illustrative example, axial movement system 320 takes the form of number of rails 322.

To apply composite material 304 to female mold 312, shaping system 310 moves along vertical axis 324. Shaping system 310 may move along vertical axis 324 towards female mold 312. Shaping system 310 includes centerline presser 326, first force application assembly 328, and second force application assembly 330. Centerline presser 326 may be moved along vertical axis 324 using movement system 332. First force application assembly 328 and second force application assembly 330 may be moved along vertical axis 324 using number of vertical arms 334.

First number of compliant elongate members 337 of first force application assembly 328 may be moved along horizontal axis 336 using first movement system 338. First number of compliant elongate members 337 may be one or more compliant elongate members. In illustrative examples in which first number of compliant elongate members 337 is more than one compliant elongate member, the compliant elongate members are connected together to form a single forming surface. First movement system 338 includes first number of arms 340 and second number of arms 342. First number of compliant elongate members 337 moves in at least one of horizontal axis 336 or vertical axis 324 relative to centerline presser 326.

Second number of compliant elongate members 343 of second force application assembly 330 may be moved along horizontal axis 336 using second movement system 344. Second number of compliant elongate members 343 may be one or more compliant elongate members. In illustrative examples in which second number of compliant elongate members 343 is more than one compliant elongate member, the compliant elongate members are connected together to form a single forming surface. Second movement system 344 includes third number of arms 346 and fourth number of arms 348. Second number of compliant elongate members 343 moves in at least one of horizontal axis 336 or vertical axis 324 relative to centerline presser 326.

First number of arms 340, second number of arms 342, third number of arms 346, and fourth number of arms 348 extend through plate 350 connected to number of vertical arms 334. First number of arms 340 extend through second number of compliant elongate members 343. Third number of arms 346 extend through first number of compliant elongate members 337.

Figure 4:
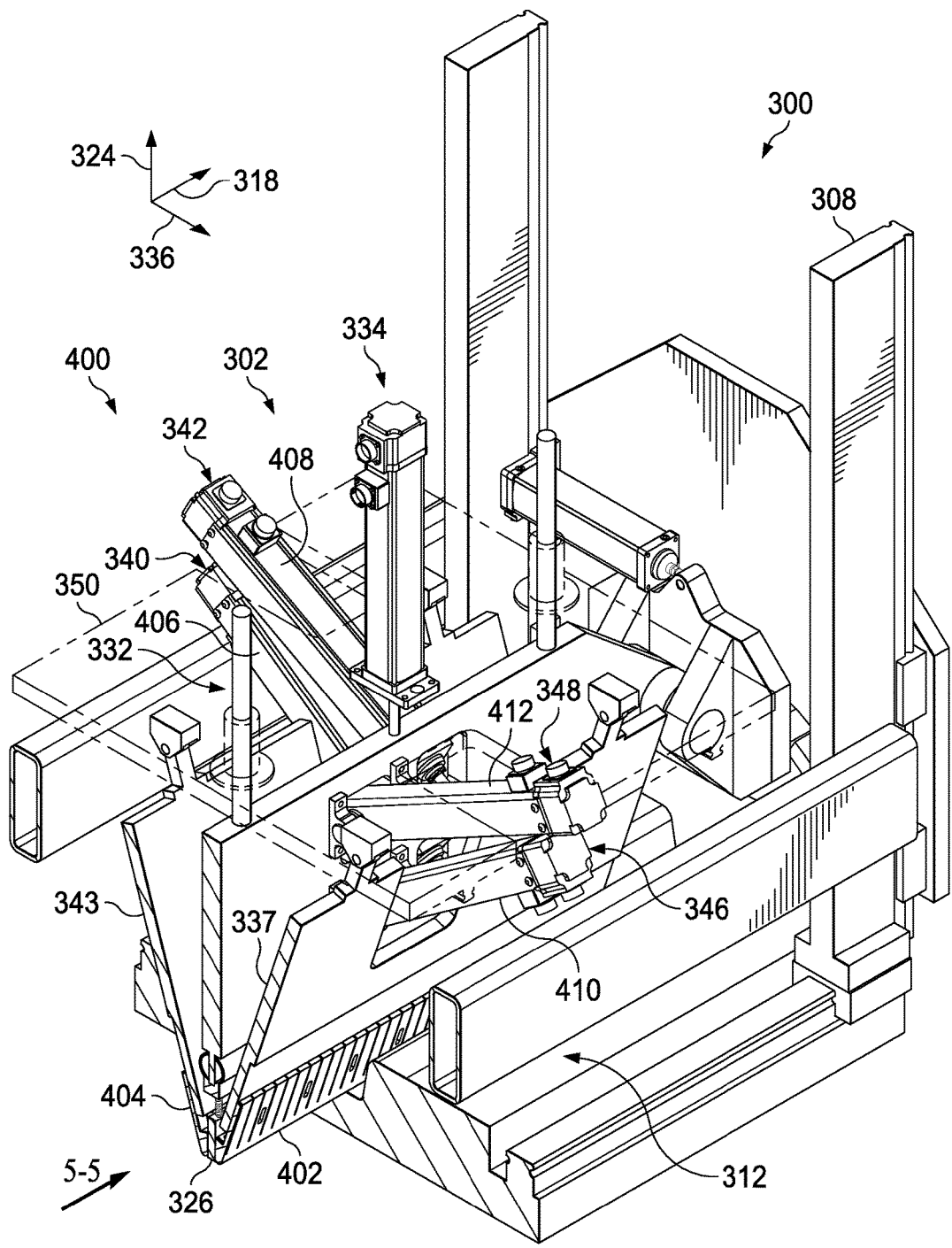
FIG. 4 is an illustration of a cross-sectional isometric view of a composite forming tool in accordance with an illustrative embodiment.

Turning now to FIG. 4, an illustration of a cross-sectional isometric view of a composite forming tool is depicted in accordance with an illustrative embodiment. View 400 is a cross-section of composite forming tool 302 along cross-section 4-4 of FIG. 3.

As depicted, forming surface 402 and forming surface 404 contact centerline presser 326. First number of arms 340 includes arm 406. Second number of arms 342 includes arm 408. Arm 406 and arm 408 extend through plate 350. Arm 406 extends through second number of compliant elongate members 343. Third number of arms 346 includes arm 410. Fourth number of arms includes arm 412. Arm 410 and arm 412 extend through plate 350. Arm 410 extend through first number of compliant elongate members 337. As depicted, arm 410 and arm 412 are connected to centerline presser 326.

Figure 5:
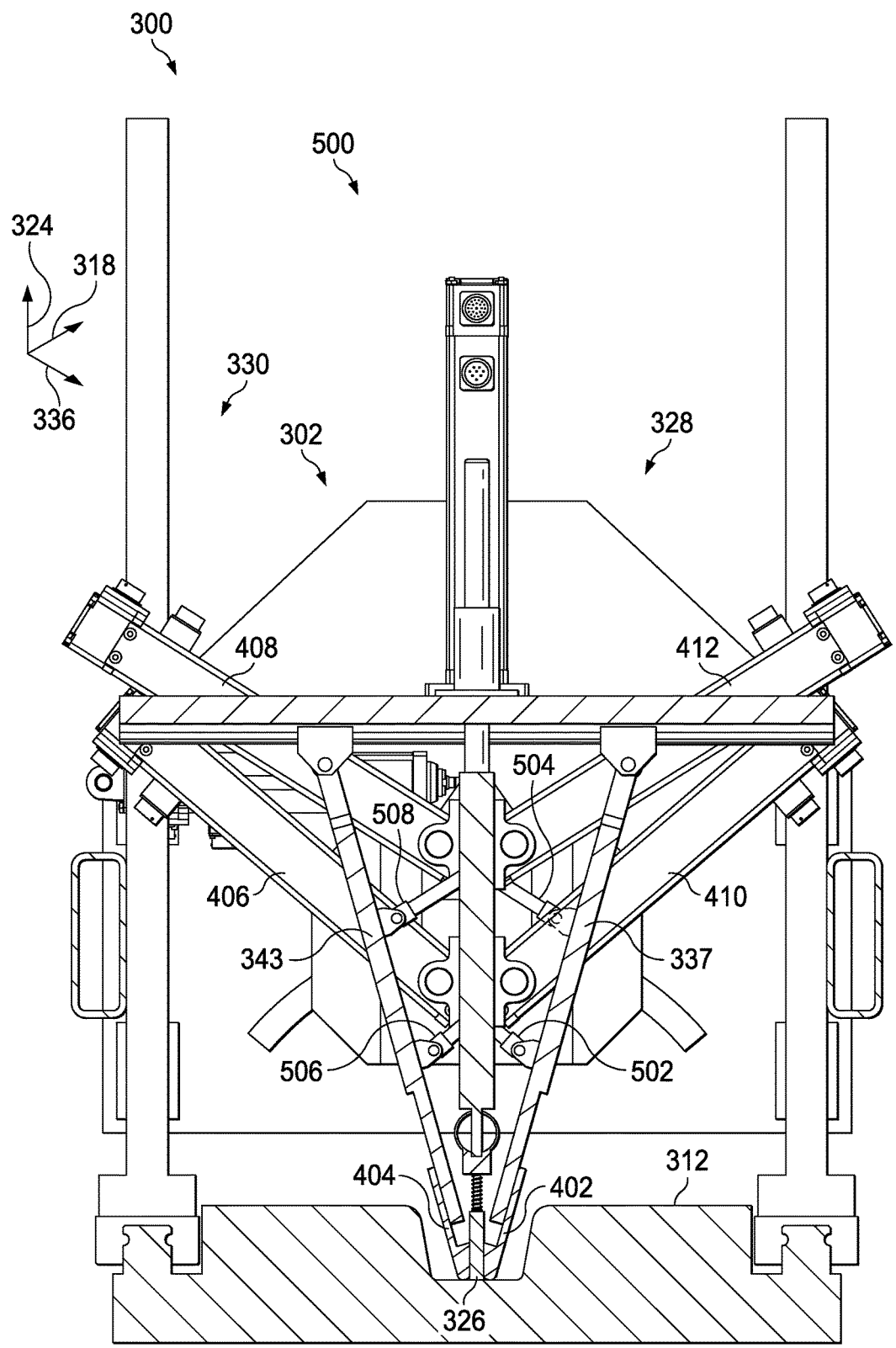
FIG. 5 is an illustration of a cross-sectional front view of a composite forming tool in accordance with an illustrative embodiment.

Turning now to FIG. 5, an illustration of a cross-sectional front view of a composite forming tool is depicted in accordance with an illustrative embodiment. View 500 is a view of composite forming tool 302 from direction 5-5 of FIG. 4.

As depicted, arm 406 and arm 408 are connected to centerline presser 326. Actuator 502 is connected to arm 406 and extends through centerline presser 326. Actuator 502 is connected to first number of compliant elongate members 337. Actuator 504 is connected to arm 408 and extends through centerline presser 326. Actuator 504 is connected to first number of compliant elongate members 337. Arm 406, arm 408, actuator 502, and actuator 504 control the movement of first number of compliant elongate members 337 along horizontal axis 336.

Arm 410 and arm 412 are connected to centerline presser 326. Actuator 506 is connected to arm 410 and extends through centerline presser 326. Actuator 506 is connected to second number of compliant elongate members 343. Actuator 508 is connected to arm 412 and extends through centerline presser 326. Actuator 508 is connected to second number of compliant elongate members 343. Arm 410, arm 412, actuator 506, and actuator 508 control the movement of second number of compliant elongate members 343 along horizontal axis 336.

As depicted, first force application assembly 328 and second force application assembly 330 have been lowered. Specifically, centerline presser 326, first force application assembly 328, and second force application assembly 330 have been lowered such that centerline presser 326 would contact a composite material or carrier positioned within composite forming tool 302.

Figure 6:
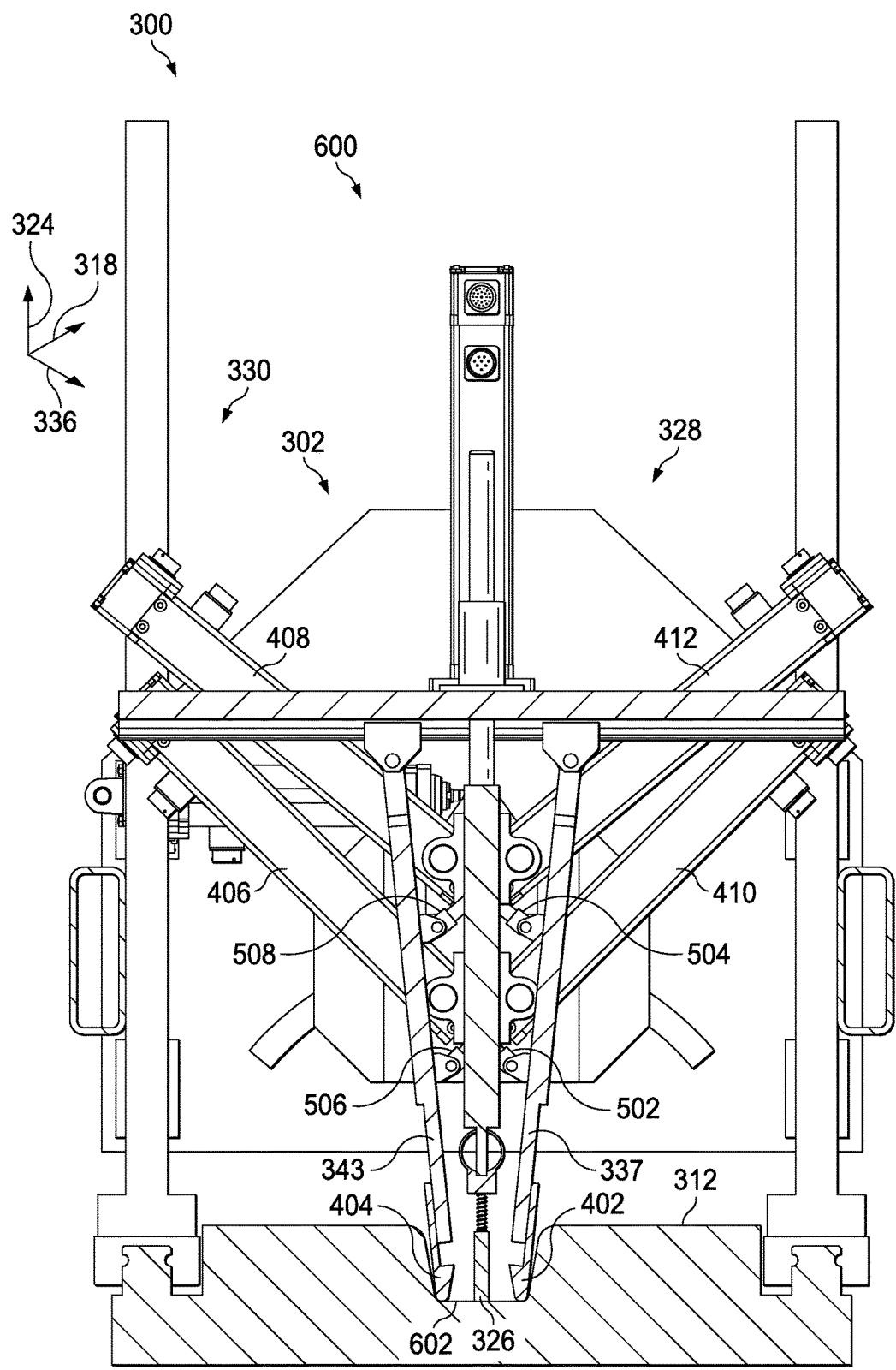
FIG. 6 is an illustration of a cross-sectional front view of a composite forming tool in accordance with an illustrative embodiment.

Turning now to FIG. 6, an illustration of a cross-sectional front view of a composite forming tool is depicted in accordance with an illustrative embodiment. In view 600, first force application assembly 328 and second force application assembly 330 have moved from view 500 of FIG. 5. Specifically, forming surface 402 and forming surface 404 have been moved along surface 602 of female mold 312. Between view 500 and view 600, first number of compliant elongate members 337 and second number of compliant elongate members 343 have moved along horizontal axis 336. During this movement, first number of compliant elongate members 337 and second number of compliant elongate members 343 would maintain a uniform amount of force against one of a carrier and a composite material such that the composite material is uniformly applied to surface 602 of female mold 312.

Figure 7:
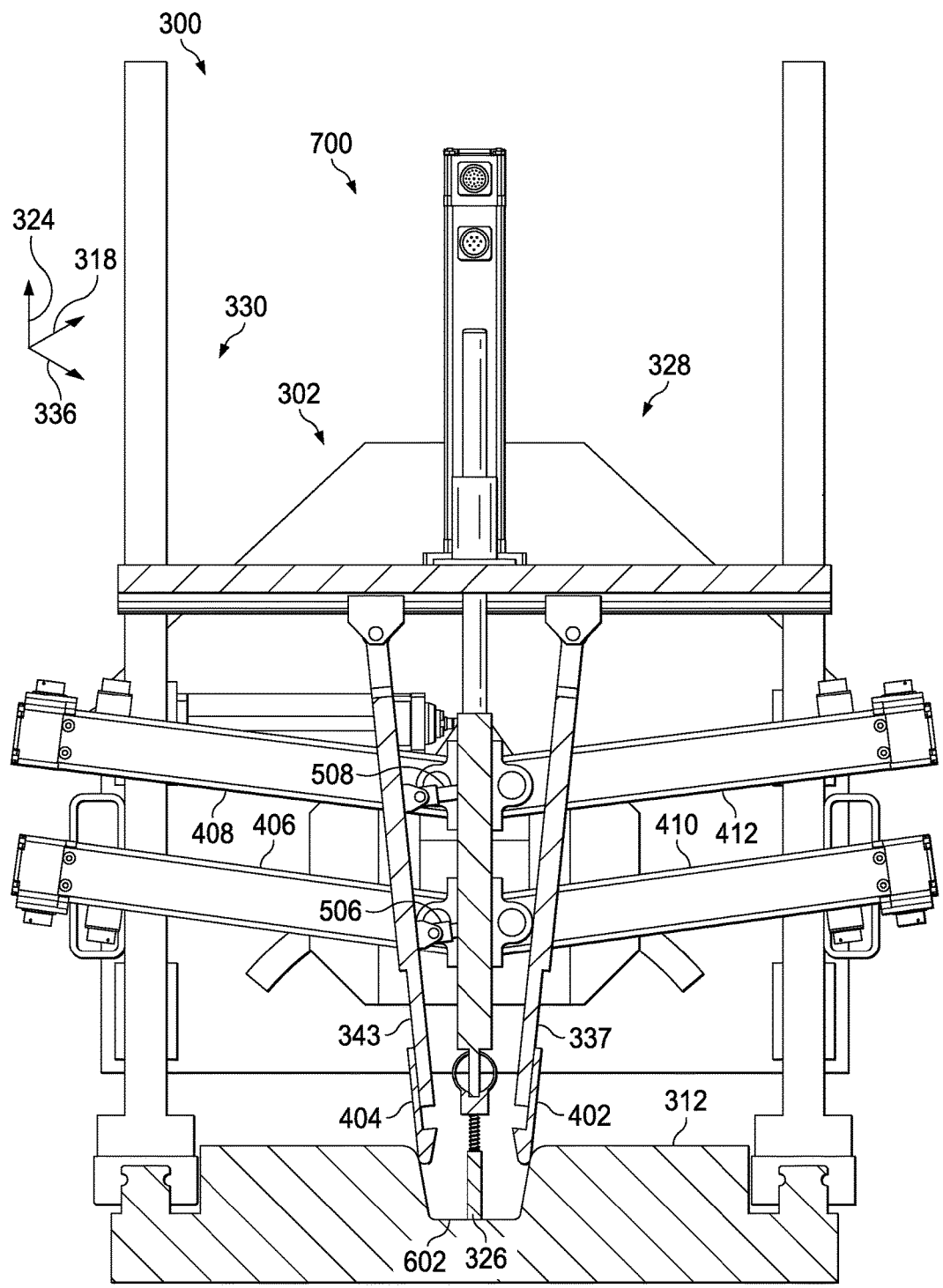
FIG. 7 is an illustration of a cross-sectional front view of a composite forming tool in accordance with an illustrative embodiment.

Turning now to FIG. 7, an illustration of a cross-sectional front view of a composite forming tool is depicted in accordance with an illustrative embodiment. In view 700, first force application assembly 328 and second force application assembly 330 have moved from view 600 of FIG. 6. Specifically, forming surface 402 and forming surface 404 have been moved along surface 602 of female mold 312. Between view 600 and view 700, first number of compliant elongate members 337 and second number of compliant elongate members 343 have moved along both horizontal axis 336 and vertical axis 324. During this movement, first number of compliant elongate members 337 and second number of compliant elongate members 343 would maintain a uniform amount of force against one of a carrier and a composite material such that the composite material is uniformly applied to surface 602 of female mold 312.

Figure 8:
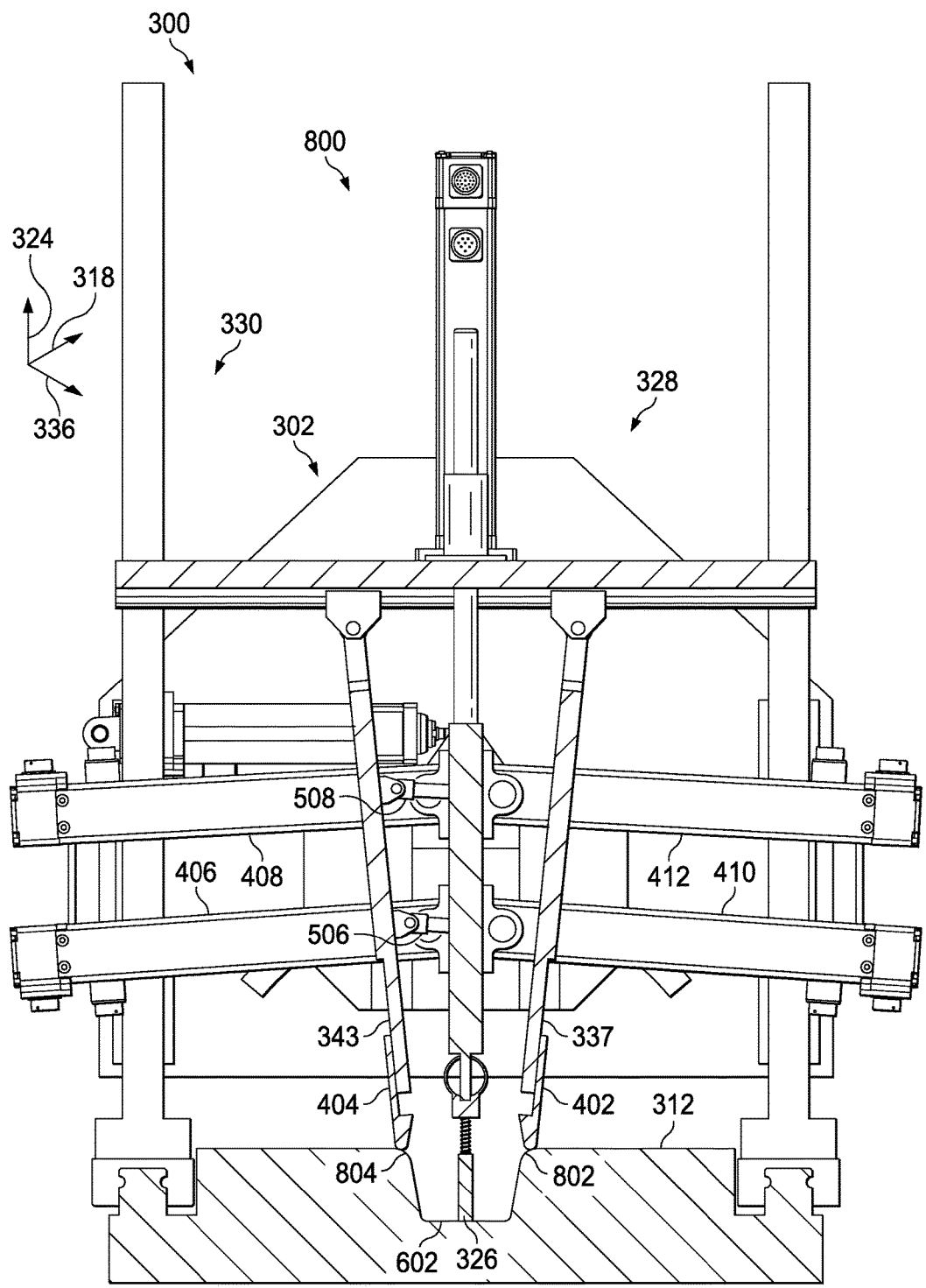
FIG. 8 is an illustration of a cross-sectional front view of a composite forming tool in accordance with an illustrative embodiment.

Turning now to FIG. 8, an illustration of a cross-sectional front view of a composite forming tool is depicted in accordance with an illustrative embodiment. In view 800, first force application assembly 328 and second force application assembly 330 have moved from view 700 of FIG. 7. Specifically, forming surface 402 and forming surface 404 have been moved along surface 602 of female mold 312. Between view 700 and view 800, first number of compliant elongate members 337 and second number of compliant elongate members 343 have moved along both horizontal axis 336 and vertical axis 324. More specifically, between view 700 and view 800, first number of compliant elongate members 337 and second number of compliant elongate members 343 have moved around corner 802 and corner 804. During this movement, first number of compliant elongate members 337 and second number of compliant elongate members 343 would maintain a uniform amount of force against one of a carrier and a composite material such that the composite material is uniformly applied to surface 602 of female mold 312.

Figure 9:
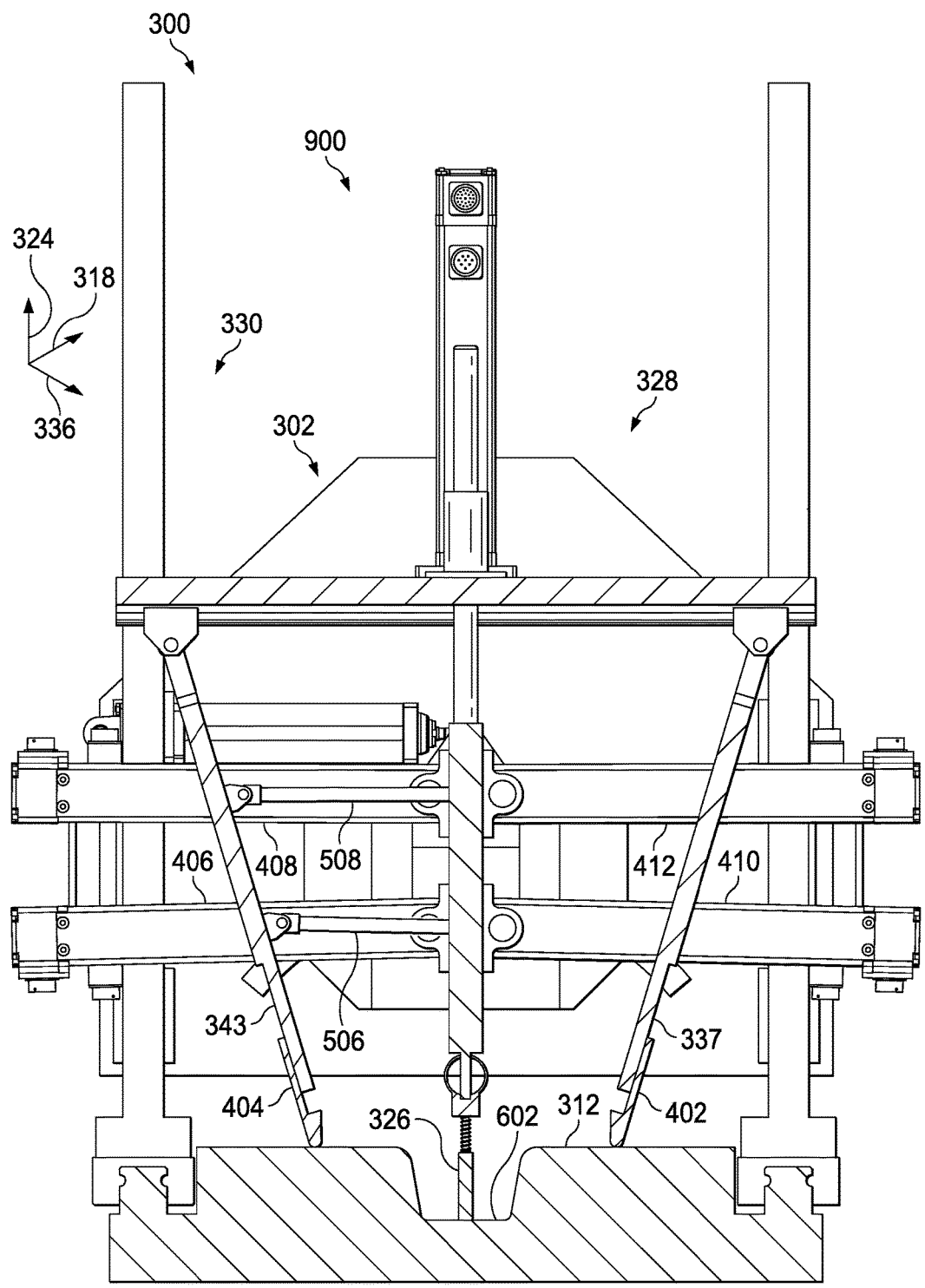
FIG. 9 is an illustration of a cross-sectional front view of a composite forming tool in accordance with an illustrative embodiment.

Turning now to FIG. 9, an illustration of a cross-sectional front view of a composite forming tool is depicted in accordance with an illustrative embodiment. In view 900, first force application assembly 328 and second force application assembly 330 have moved from view 800 of FIG. 8. Specifically, forming surface 402 and forming surface 404 have been moved along surface 602 of female mold 312. Between view 800 and view 900, first number of compliant elongate members 337 and second number of compliant elongate members 343 have moved along horizontal axis 336. During this movement, first number of compliant elongate members 337 and second number of compliant elongate members 343 would maintain a uniform amount of force against one of a carrier and a composite material such that the composite material is uniformly applied to surface 602 of female mold 312.

As can be seen from FIGS. 5-9, first number of compliant elongate members 337 and second number of compliant elongate members 343 of shaping system 310 are moved to substantially mirror a number of features of the surface of female mold 312. Specifically, forming surface 402 and forming surface 404 follow the features of surface 602 of female mold 312. As used herein, "a number of," when used with reference to items means one or more items. Further, as can be seen from FIGS. 5-9, first number of compliant elongate members 337 and second number of compliant elongate members 343 of shaping system 310 are moved substantially simultaneously. In this illustrative example, first number of compliant elongate members 337 and second number of compliant elongate members 343 of shaping system 310 are moved in paths which are substantially mirror images of each other.

Figure 10:
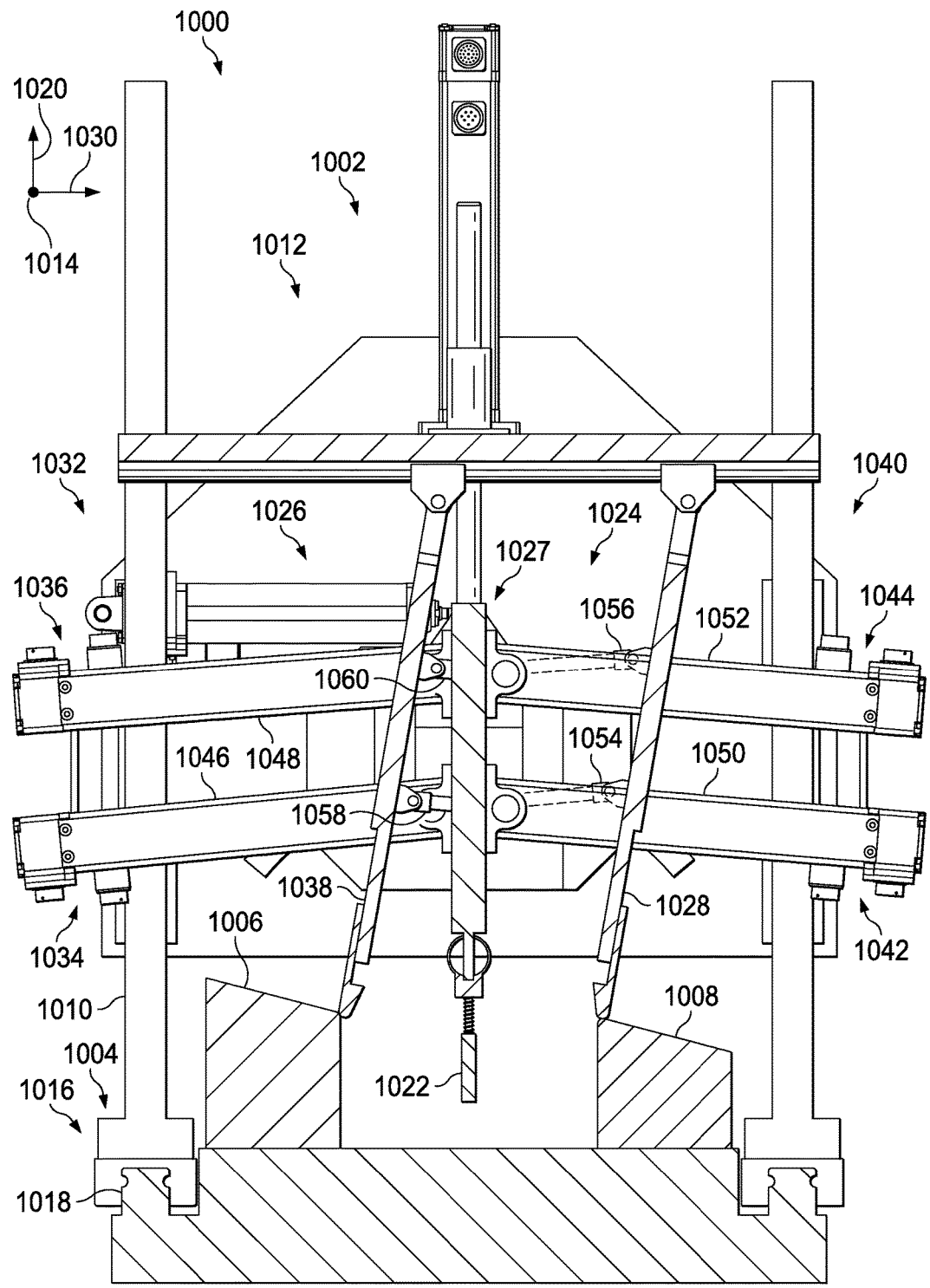
FIG. 10 is an illustration of a cross-sectional front view of a composite forming tool in accordance with an illustrative embodiment.

Turning now to FIG. 10, an illustration of a cross-sectional front view of a composite forming tool is depicted in accordance with an illustrative embodiment. In view 1000, composite forming tool 1002 includes base 1004. Base 1004 takes the form of first male mold 1006 and second male mold 1008. First male mold 1006 and second male mold 1008 are movable relative to each other.

Composite forming tool 1002 also includes frame 1010 and shaping system 1012. Frame 1010 is associated with shaping system 1012. Shaping system 1012 is movable relative to frame 1010, base 1004, and a prepreg material. To apply a composite material to the length of first male mold 1006 and second male mold 1008, frame 1010 and associated shaping system 1012 are translated along longitudinal axis 1014 that extends into and out of the page.

Frame 1010 translates along longitudinal axis 1014 using axial movement system 1016. In this illustrative example, axial movement system 1016 takes the form of number of rails 1018.

To apply a composite material to first male mold 1006 and second male mold 1008, shaping system 1012 moves along vertical axis 1020. Shaping system 1012 may move along vertical axis 1020 towards base 1004. Shaping system 1012 includes centerline presser 1022, first force application assembly 1024, and second force application assembly 1026. Centerline presser 1022 may be moved along vertical axis 1020 using movement system 1027. First force application assembly 1024 and second force application assembly 1026 may be moved along vertical axis 1020 using a number of vertical arms (not depicted).

First number of compliant elongate members 1028 of first force application assembly 1024 may be moved along horizontal axis 1030 using first movement system 1032. First movement system 1032 includes first number of arms 1034 and second number of arms 1036.

Second number of compliant elongate members 1038 of second force application assembly 1026 may be moved along horizontal axis 1030 using second movement system 1040. Second movement system 1040 includes third number of arms 1042 and fourth number of arms 1044.

At least one of first number of arms 1034, second number of arms 1036, third number of arms 1042, or fourth number of arms 1044 extend through portions of composite forming tool 1002. As depicted, first number of arms 1034 extend through second number of compliant elongate members 1038. Third number of arms 1042 extend through first number of compliant elongate members 1028.

First number of arms 1034 includes arm 1046. Second number of arms 1036 includes arm 1048. Third number of arms 1042 includes arm 1050. Fourth number of arms 1044 includes arm 1052. Arm 1046, arm 1048, arm 1050, and arm 1052 are each connected to centerline presser 1022. Each of arm 1046, arm 1048, arm 1050, and arm 1052 are connected to a respective actuator that extends through centerline presser 1022. Arm 1046 is connected to actuator 1054 that extends through centerline presser 1022 and is connected to first number of compliant elongate members 1028. Arm 1048 is connected to actuator 1056 that extends through centerline presser 1022 and is connected to first number of compliant elongate members 1028. Arm 1050 is connected to actuator 1058 that extends through centerline presser 1022 and is connected to second number of compliant elongate members 1038. Arm 1052 is connected to actuator 1060 that extends through centerline presser 1022 and is connected to second number of compliant elongate members 1038.

Figure 11:
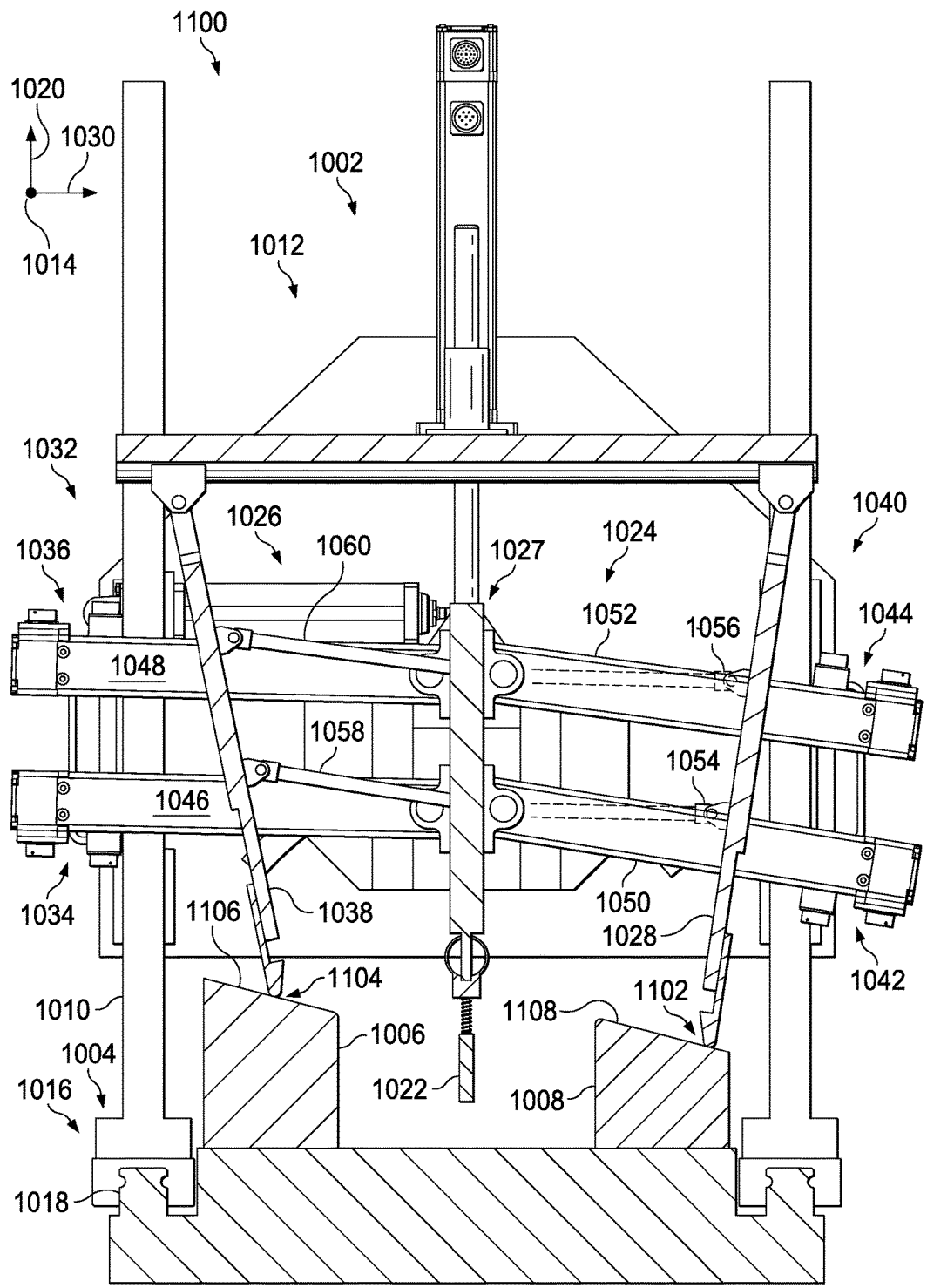
FIG. 11 is an illustration of a cross-sectional front view of a composite forming tool in accordance with an illustrative embodiment.

Turning now to FIG. 11, an illustration of a cross-sectional front view of a composite forming tool is depicted in accordance with an illustrative embodiment. In view 1100, first force application assembly 1024 and second force application assembly 1026 have moved from the view of FIG. 10. Specifically, forming surface 1102 and forming surface 1104 have been moved along surface 1106 of first male mold 1006 and surface 1108 of second male mold 1008. Between FIG. 10 and view 1100, first number of compliant elongate members 1028 and second number of compliant elongate members 1038 have moved along both horizontal axis 1030 and vertical axis 1020. During this movement, first number of compliant elongate members 1028 and second number of compliant elongate members 1038 would maintain a uniform amount of force against one of a carrier and a composite material such that the composite material is uniformly applied to surface 1106 of first male mold 1006 and surface 1108 of second male mold 1008.

Figure 12:
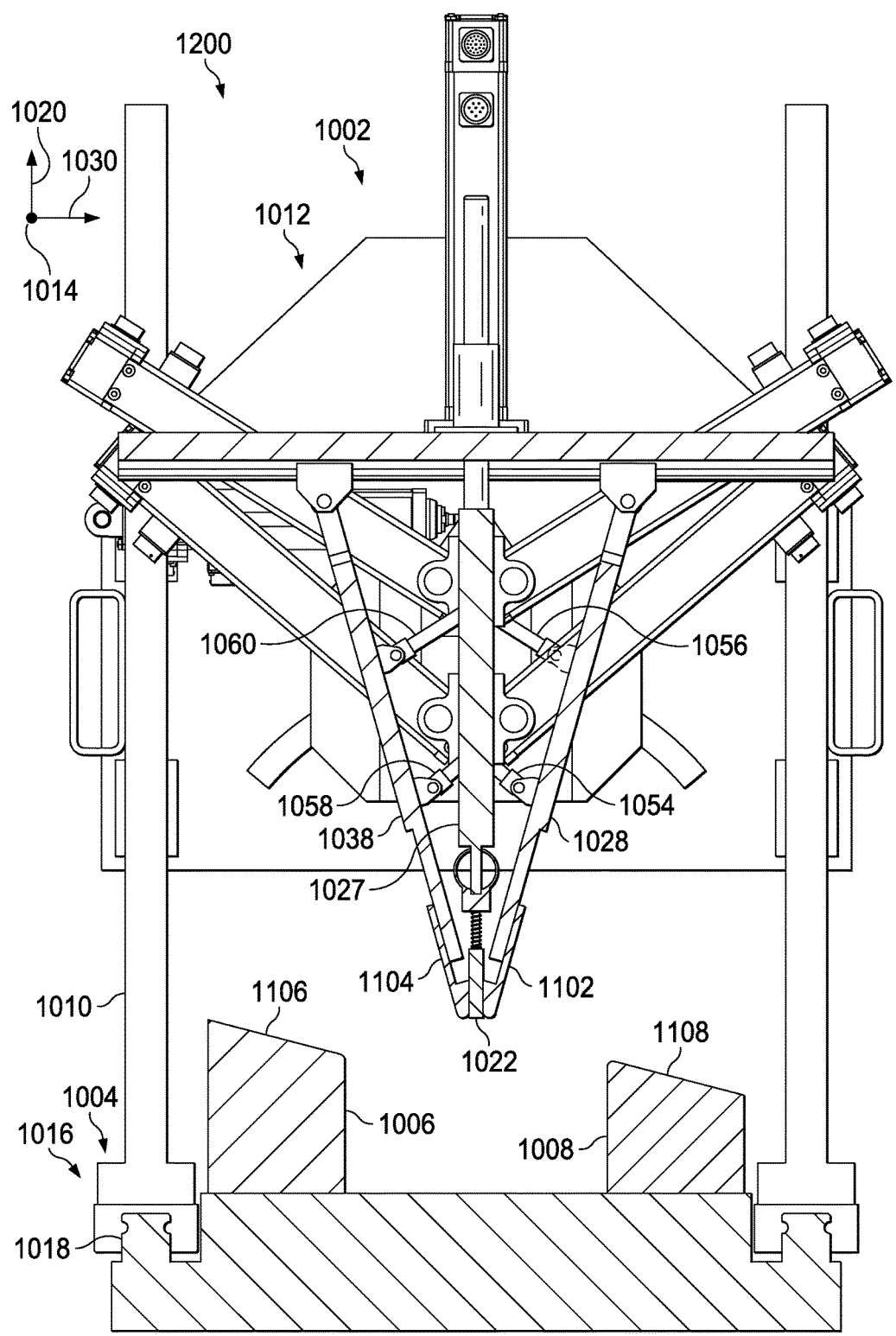
FIG. 12 is an illustration of a cross-sectional front view of a composite forming tool in accordance with an illustrative embodiment.

Turning now to FIG. 12, an illustration of a cross-sectional front view of a composite forming tool is depicted in accordance with an illustrative embodiment. In view 1200, first force application assembly 1024 and second force application assembly 1026 have moved from view 1100 of FIG. 11. Specifically, first force application assembly 1024, second force application assembly 1026, and centerline presser 1022 have been retracted. As depicted, forming surface 1102 and forming surface 1104 contact centerline presser 1022.

Figure 13:
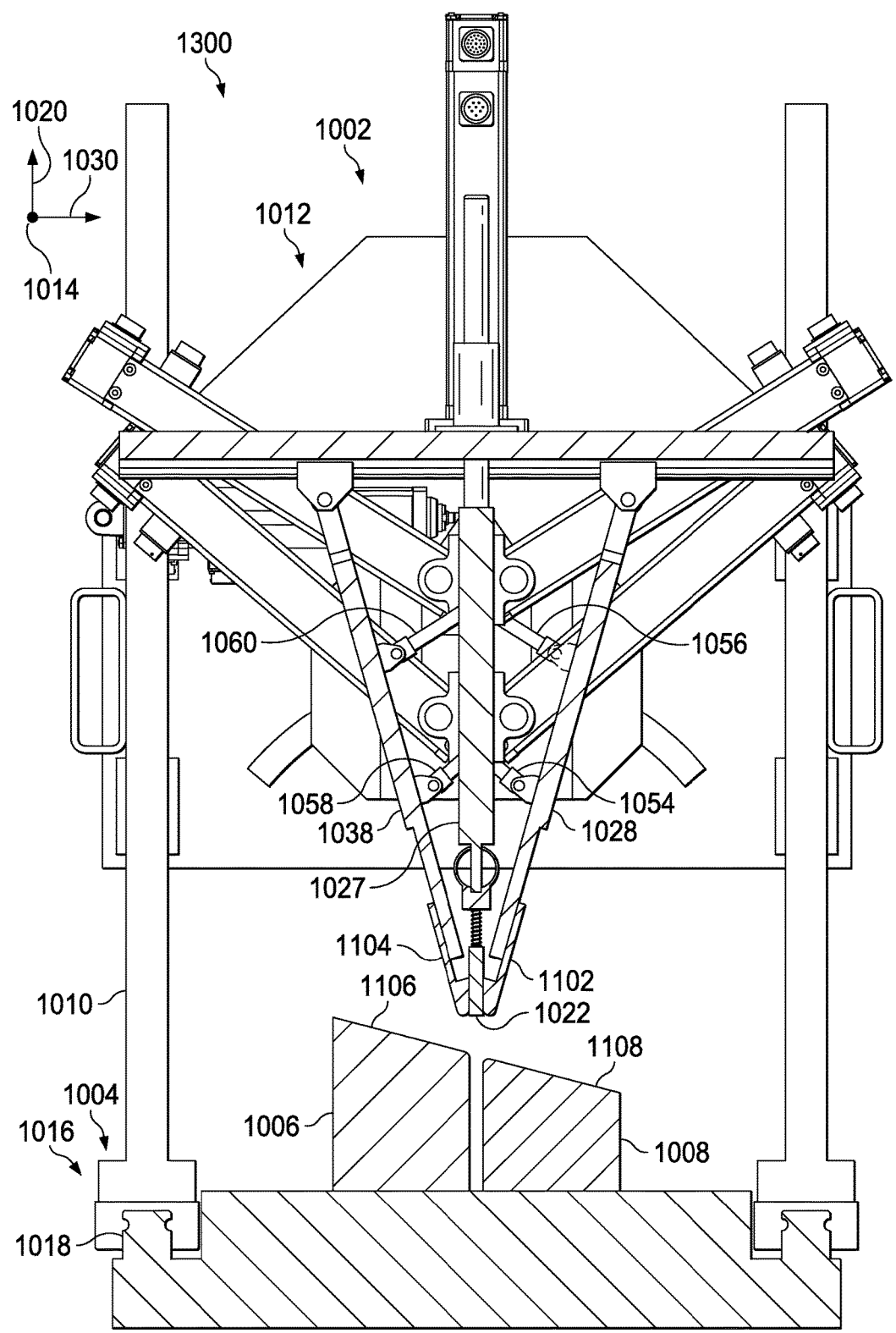
FIG. 13 is an illustration of a cross-sectional front view of a composite forming tool in accordance with an illustrative embodiment.

Turning now to FIG. 13, an illustration of a cross-sectional front view of a composite forming tool is depicted in accordance with an illustrative embodiment. In view 1300, first male mold 1006 and second male mold 1008 have moved from view 1200 of FIG. 12. Specifically, first male mold 1006 and second male mold 1008 have been moved along horizontal axis 1030 towards each other.

In some illustrative examples, a single composite material may be laid up onto first male mold 1006 and second male mold 1008. In these illustrative examples, moving first male mold 1006 and second male mold 1008 along horizontal axis 1030 towards each other may form a blade shaped stringer by forming a bend in the composite material between first male mold 1006 and second male mold 1008. In other illustrative examples, a first composite material may be laid up onto first male mold 1006 and a second composite material may be laid up onto second male mold 1008. Both the first and the second composite material may be carried by a single carrier. In these illustrative examples, moving first male mold 1006 and second male mold 1008 along horizontal axis 1030 towards each other may form a blade shaped stringer by having portions of the first composite material contact portions of the second composite material.

In some illustrative examples, after moving first male mold 1006 and second male mold 1008 along horizontal axis 1030 towards each other, an additional composite material may be placed over the composite material formed into the blade stringer shape. This additional composite material may be referred to as a composite charge or a composite base.

Figure 14:
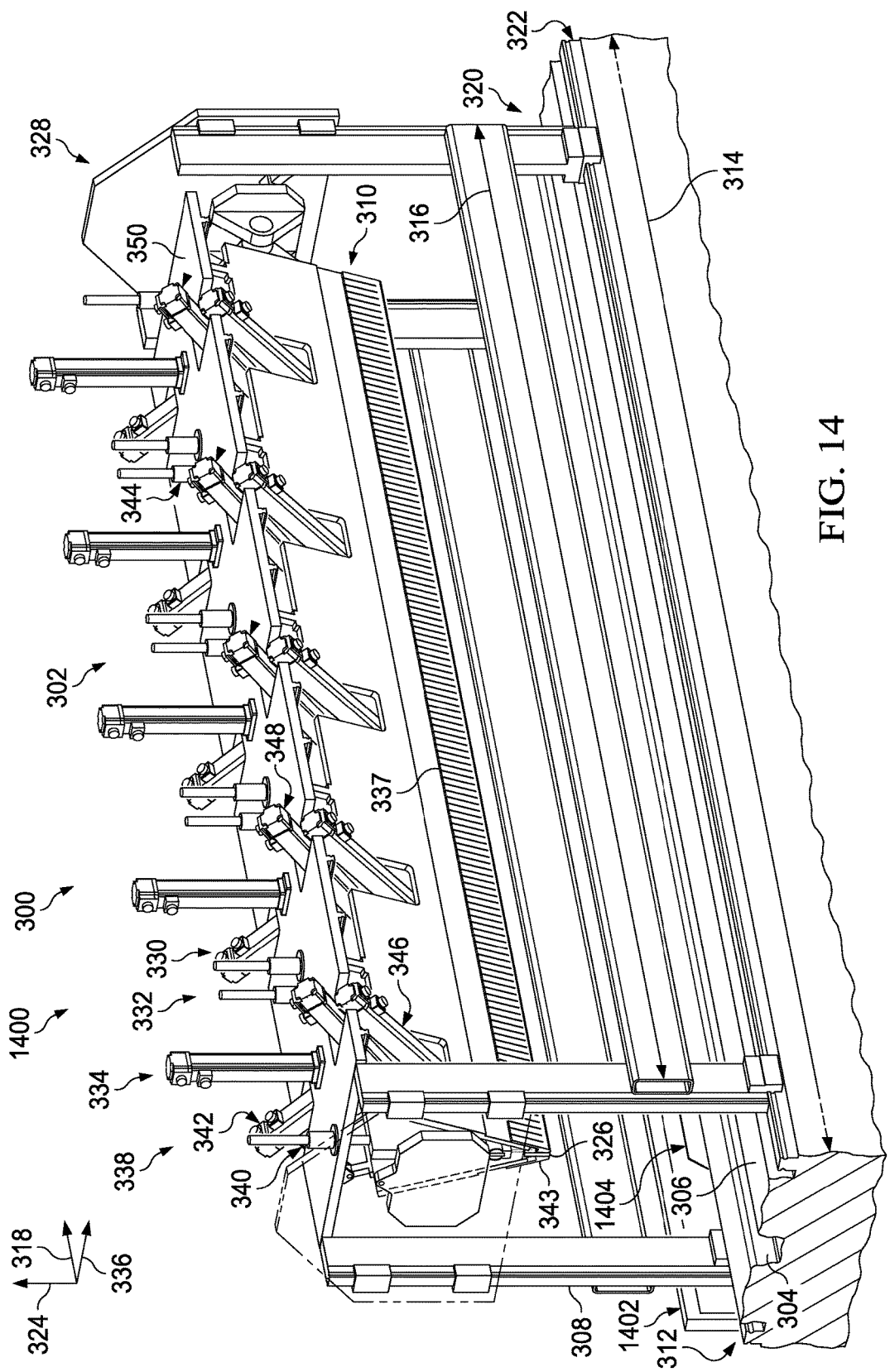
FIG. 14 is an illustration of a carrier and a composite forming tool in a manufacturing environment in accordance with an illustrative embodiment.

Turning now to FIG. 14, an illustration of a carrier and a composite forming tool in a manufacturing environment is depicted in accordance with an illustrative embodiment. View 1400 is a view of composite forming tool 302 and carrier 1402 holding composite material 1404 prior to positioning carrier 1402 within composite forming tool 302.

Figure 15:
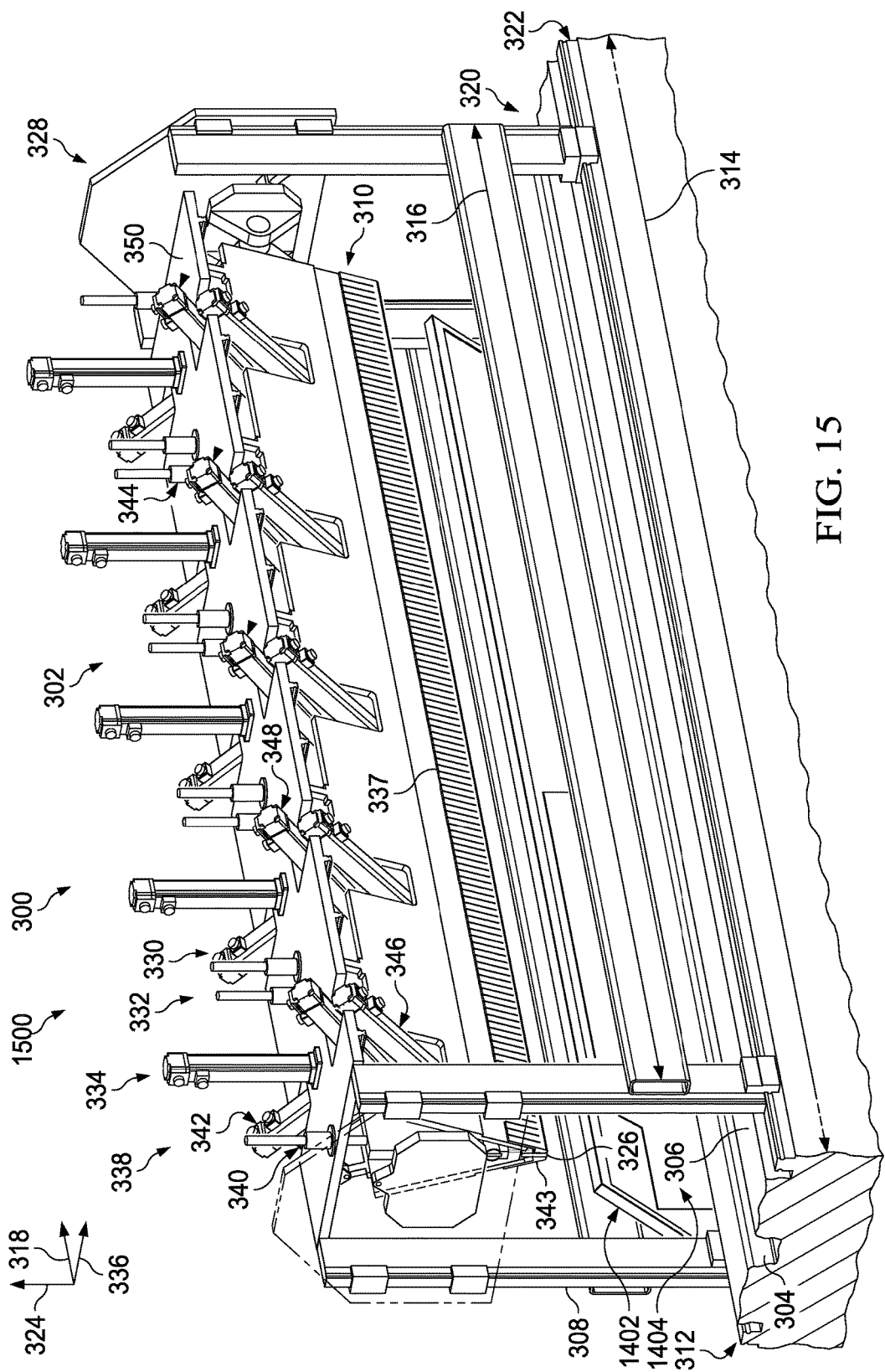
FIG. 15 is an illustration of a carrier and a composite forming tool in a manufacturing environment in accordance with an illustrative embodiment.

Turning now to FIG. 15, an illustration of a carrier and a composite forming tool in a manufacturing environment is depicted in accordance with an illustrative embodiment. View 1500 is a view of composite forming tool 302 and carrier 1402 during positioning of carrier 1402. In view 1500, carrier 1402 holding composite material 1404 has entered frame 308 of composite forming tool 302.

Figure 16:
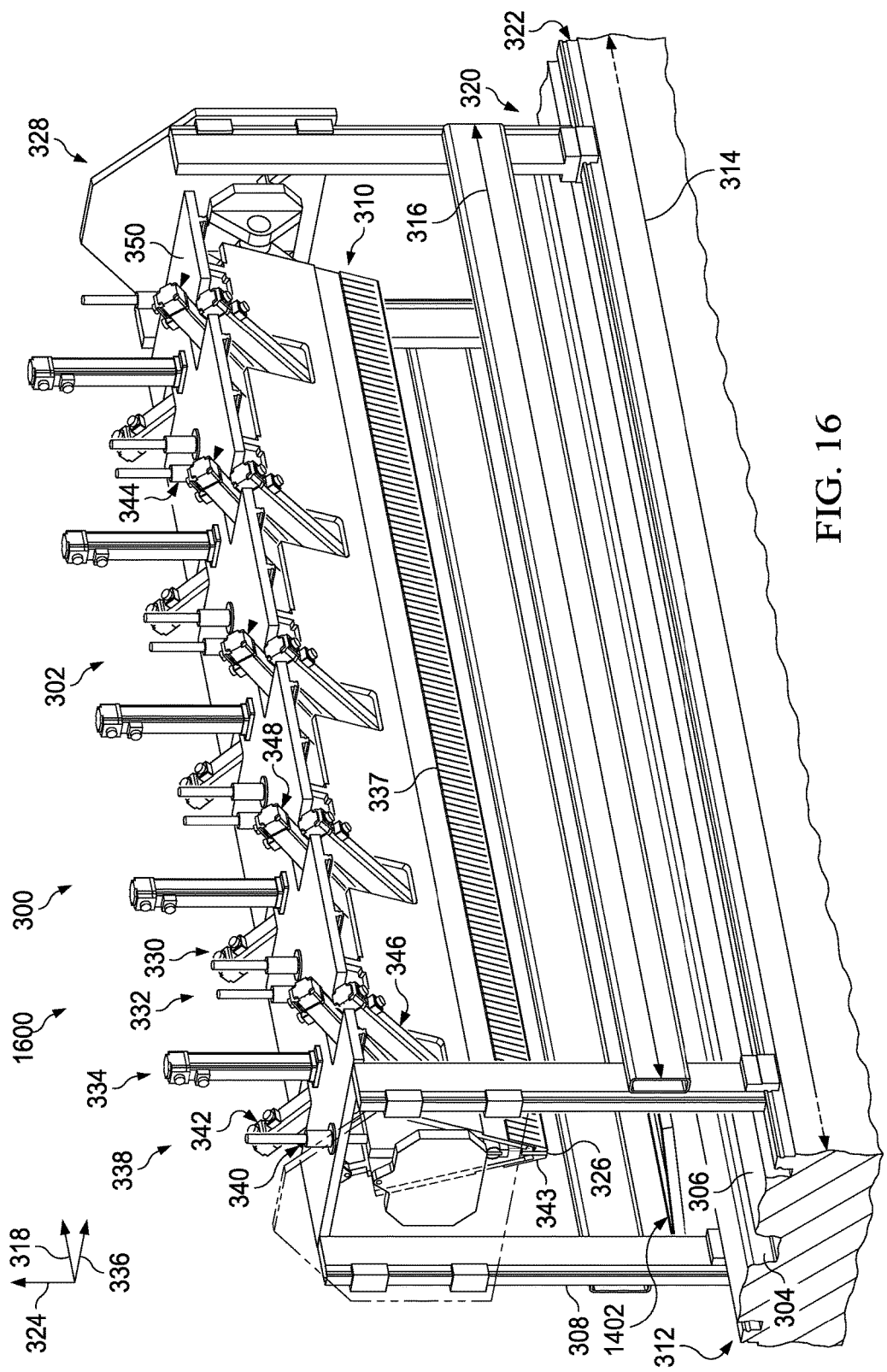
FIG. 16 is an illustration of a carrier and a composite forming tool in a manufacturing environment in accordance with an illustrative embodiment.

Turning now to FIG. 16, an illustration of a carrier and a composite forming tool in a manufacturing environment is depicted in accordance with an illustrative embodiment. View 1600 is a view of composite forming tool 302 and carrier 1402 during positioning of carrier 1402. In view 1600, carrier 1402 is being rotated such that composite material 1404 (not shown in this view) will face base 306 of composite forming tool 302.

Figure 17:
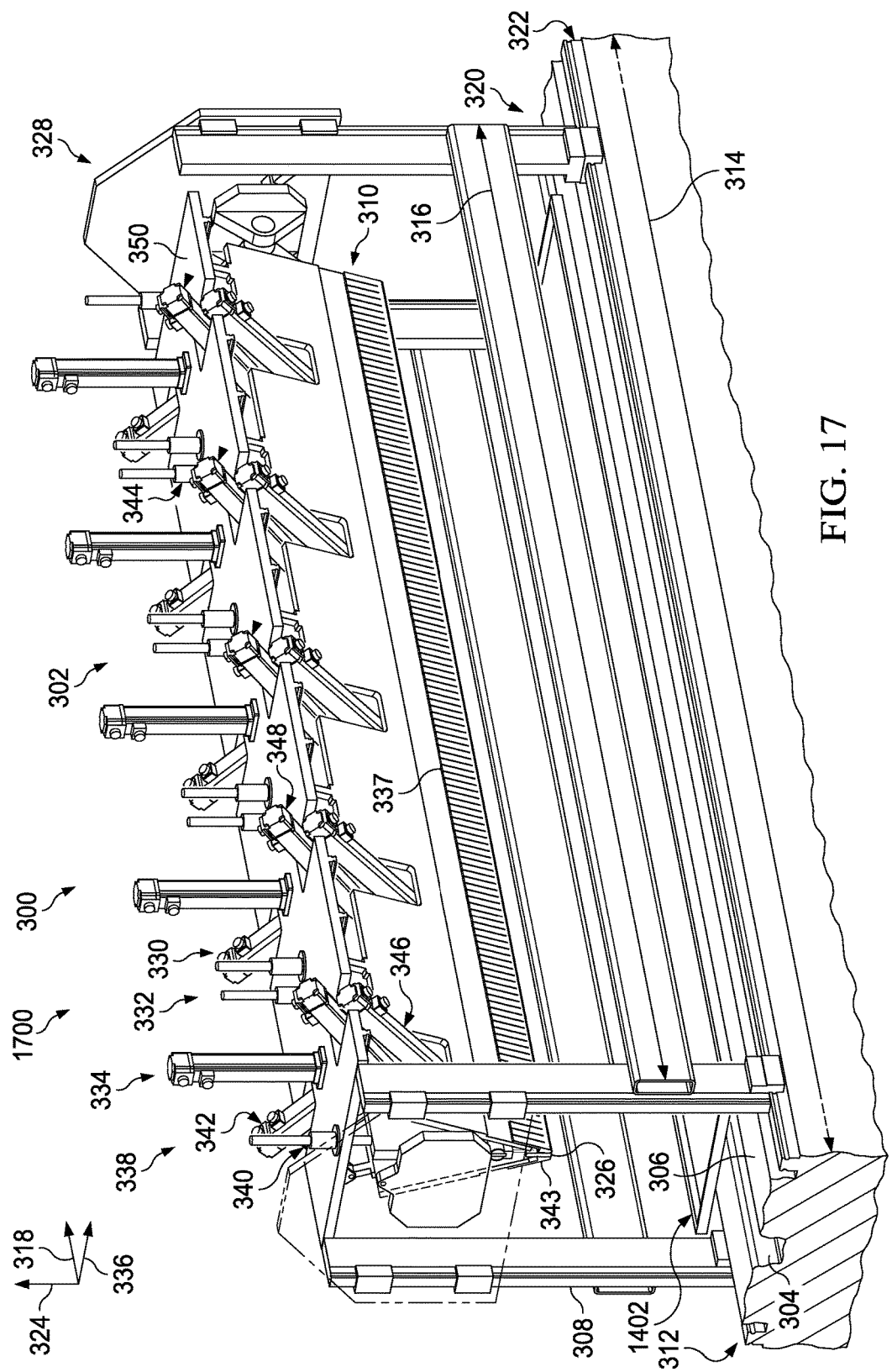
FIG. 17 is an illustration of a carrier and a composite forming tool in a manufacturing environment in accordance with an illustrative embodiment.

Turning now to FIG. 17, an illustration of a carrier and a composite forming tool in a manufacturing environment is depicted in accordance with an illustrative embodiment. View 1700 is a view of composite forming tool 302 and carrier 1402 positioned within composite forming tool 302. In view 1700 carrier 1402 has been aligned within composite forming tool 302 but forming has not begun.

Figure 18:
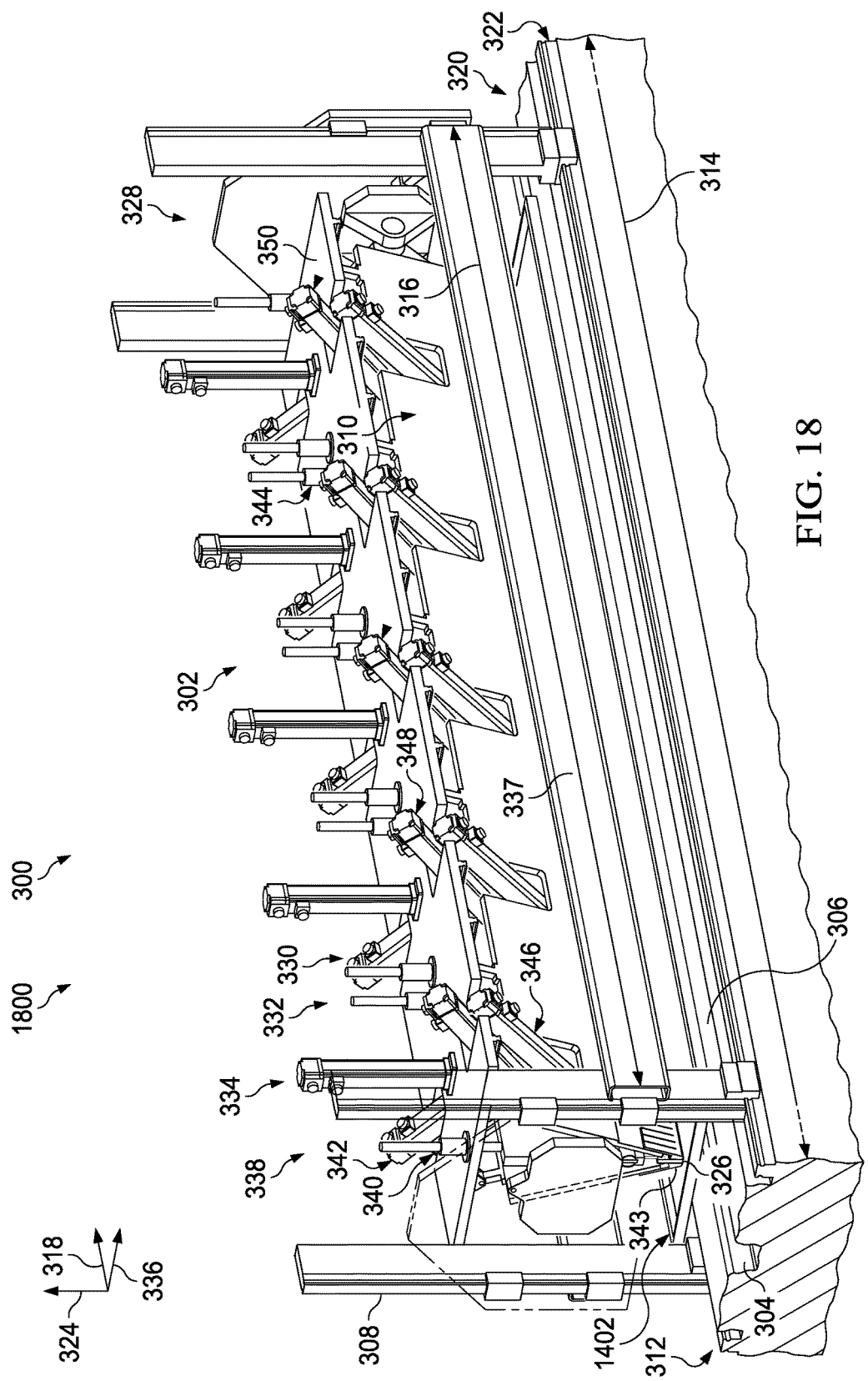
FIG. 18 is an illustration of a carrier and a composite forming tool in a manufacturing environment in accordance with an illustrative embodiment.

Turning now to FIG. 18, an illustration of a carrier and a composite forming tool in a manufacturing environment is depicted in accordance with an illustrative embodiment. View 1800 is a view of composite forming tool 302 and carrier 1402 positioned within composite forming tool 302. In view 1800, shaping system 310 of composite forming tool 302 is being lowered towards carrier 1402 and base 306.

Figure 19:
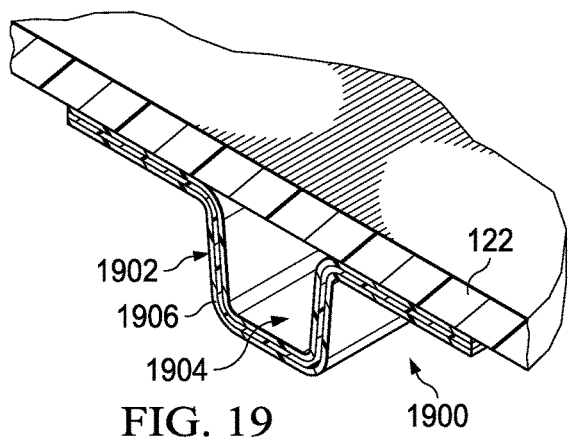
FIG. 19 is an illustration of a vent stringer formed on a composite forming tool in accordance with an illustrative embodiment.

Turning now to FIG. 19, an illustration of a vent stringer formed on a composite forming tool is depicted in accordance with an illustrative embodiment. View 1900 of FIG. 19 may be an enlarged view of a stiffener in stiffeners 120 in section X-X of FIG. 1. As depicted, stiffener 1902 is associated with composite skin 122. Stiffener 1902 is a composite part. Stiffener 1902 as depicted is a vent stringer.

Stiffener 1902 has substantially hat shaped cross-section 1904. Stiffener 1902 is formed of number of plies 1906 which each have substantially hat shaped cross-section 1904. Stiffener 1902 may be formed on composite forming tool such as composite forming tool 202 of FIG. 2 or composite forming tool 302 of FIG. 3. Number of plies 1906 may each be successively positioned relative to and shaped by a composite forming tool. Number of plies 1906 may be shaped one at a time on a female mold, such as female mold 272 of FIG. 2 or female mold 312 of FIG. 3.

Figure 20:
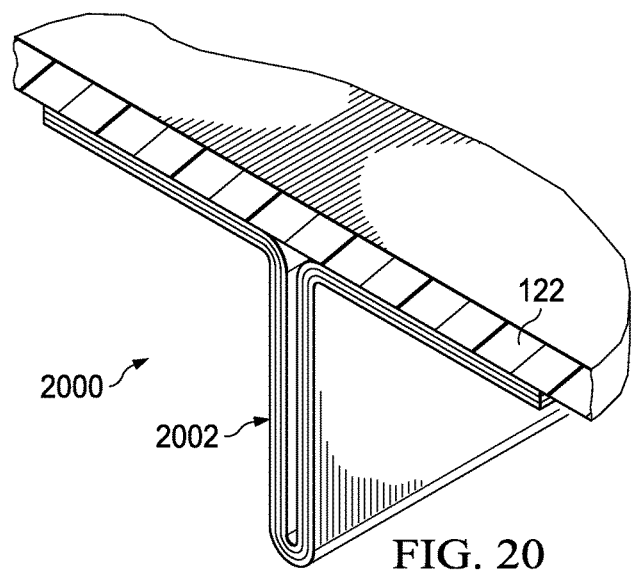
FIG. 20 is an illustration of a blade stringer formed on a composite forming tool in accordance with an illustrative embodiment.

Turning now to FIG. 20, an illustration of a blade stringer formed on a composite forming tool is depicted in accordance with an illustrative embodiment. View 2000 of FIG. 20 may be an enlarged view of a stiffener in stiffeners 120 in section X-X of FIG. 1. As depicted, stiffener 2002 is associated with composite skin 122. Stiffener 2002 is a composite part. Stiffener 2002 as depicted is a blade stringer.

Stiffener 2002 is formed of a number of plies. Stiffener 2002 may be formed on a composite forming tool, such as composite forming tool 202 of FIG. 2 or composite forming tool 302 of FIG. 3. In one illustrative example, the number of plies of stiffener 2002 may each be successively positioned relative to and shaped by a composite forming tool. In another illustrative example, the number of plies of stiffener 2002 may be simultaneously positioned relative to the composite forming tool and then shaped simultaneously. Stiffener 2002 may be shaped and formed on a number of male molds, such as number of male molds 274 of FIG. 2 or first male mold 1006 and second male mold 1008 of FIG. 10.

Figure 21:
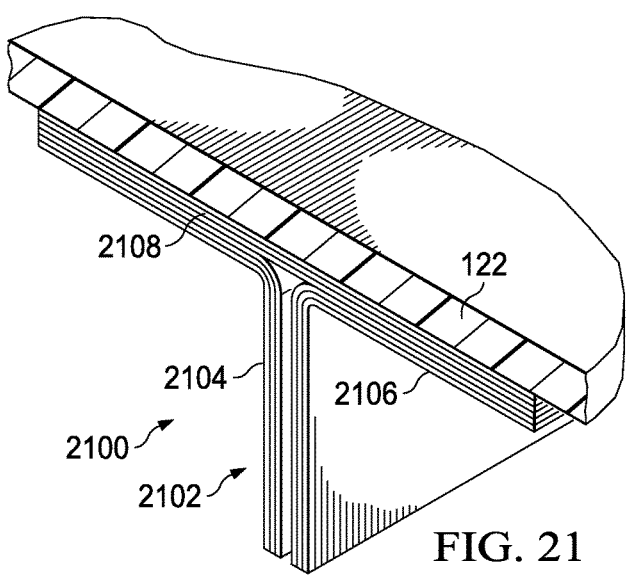
FIG. 21 is an illustration of a blade stringer formed on a composite forming tool in accordance with an illustrative embodiment.

Turning now to FIG. 21, an illustration of a blade stringer formed on a composite forming tool is depicted in accordance with an illustrative embodiment. View 2100 of FIG. 21 may be an enlarged view of a stiffener in stiffeners 120 in section X-X of FIG. 1. As depicted, stiffener 2102 is associated with composite skin 122. Stiffener 2102 is a composite part. Stiffener 2102 as depicted is a blade stringer.

Stiffener 2102 is formed of first composite material 2104, second composite material 2106, and composite base 2108. Each of first composite material 2104, second composite material 2106, and composite base 2108 is formed of a number of plies. In some illustrative examples, each of first composite material 2104, second composite material 2106, and composite base 2108 are formed of the same number of plies. In other illustrative examples, at least one of first composite material 2104, second composite material 2106, or composite base 2108 may be formed of a different number of plies than the others.

Stiffener 2102 may be formed on a composite forming tool, such as composite forming tool 202 of FIG. 2 or composite forming tool 302 of FIG. 3. In one illustrative example, first composite material 2104, second composite material 2106, and composite base 2108 of stiffener 2102 may each be successively positioned relative to and shaped by a composite forming tool. In another illustrative example, first composite material 2104 and second composite material 2106 of stiffener 2102 may be simultaneously positioned relative to the composite forming tool and then shaped simultaneously. Stiffener 2102 may be shaped and formed on a number of male molds, such as number of male molds 274 of FIG. 2 or first male mold 1006 and second male mold 1008 of FIG. 10.

The illustrations of composite forming tools in FIGS. 3-18 and stiffeners in FIGS. 19 and 20 are not meant to imply physical or architectural limitations to the manner in which an illustrative embodiment may be implemented. Other components in addition to or in place of the ones illustrated may be used. Some components may be optional.

The different components shown in FIGS. 1 and 3-20 may be illustrative examples of how components shown in block form in FIG. 2 can be implemented as physical structures. Additionally, some of the components in FIGS. 1 and 3-20 may be combined with components in FIG. 2, used with components in FIG. 2, or a combination of the two.

Figure 22:
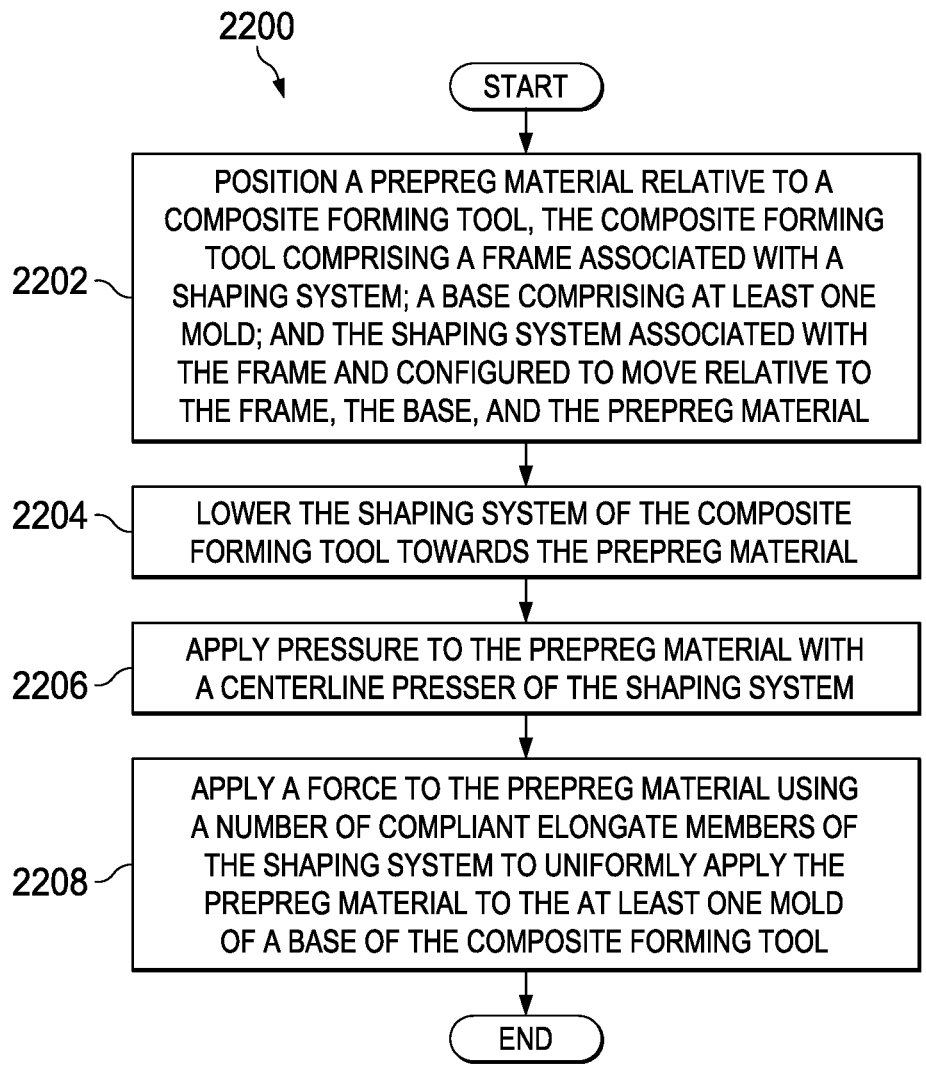
FIG. 22 is an illustration of a flowchart of a process for forming a composite part in accordance with an illustrative embodiment.

Turning now to FIG. 22, an illustration of a flowchart of a process for forming a composite part is depicted in accordance with an illustrative embodiment. Process 2200 may be used to form a composite part such as composite part 203 of FIG. 2. Process 2200 may be performed on a composite forming tool such as composite forming tool 202 of FIG. 2 or composite forming tool 302 of FIG. 3. The method may begin by positioning a prepreg material relative to a composite forming tool, the composite forming tool comprising a frame associated with a shaping system; a base comprising at least one mold; and the shaping system associated with the frame and configured to move relative to the frame, the base, and the prepreg material (operation 2202).

The method may then lower the shaping system of the composite forming tool towards the prepreg material (operation 2204). The shaping system may be shaping system 232 of FIG. 2. The shaping system may include a centerline presser, a first force application assembly, and a second force application assembly. The shaping system of the composite forming tool may be lowered such that the components of the shaping system may be able to reach the carrier to shape the prepreg material.

The method may then apply pressure to the prepreg material with a centerline presser of the shaping system (operation 2206). In some illustrative examples, by applying pressure to the prepreg material with the centerline presser, the prepreg material may contact the base. In these illustrative examples, the base may take the form of a female mold. In other illustrative examples, by applying pressure to the prepreg material with the centerline presser, the prepreg material may be pushed down by the centerline presser without contacting the base. In these illustrative examples, the prepreg material may be pulled taut by contacting the carrier with the centerline presser without the prepreg material contacting the base. This illustrative example may be performed when the base takes the form of a number of male molds.

The method then applies a force to the prepreg material using a number of compliant elongate members of the shaping system to uniformly apply the prepreg material to the at least one mold of a base of the composite forming tool (operation 2208). Afterwards, the process terminates.

To uniformly apply the prepreg material to the base, the force against the prepreg material must be substantially uniform as it is applied. At least one movement system controls the movement of and force applied by the number of compliant elongate members. In some illustrative examples, three types of arms may be associated with each compliant elongate member. For example, a first number of compliant elongate members may be moved by a combination of a number of vertical arms, a first number of arms, and a second number of arms.

In some illustrative examples, applying the force to the prepreg material using the number of compliant elongate members of the shaping system comprises moving the number of compliant elongate members of the shaping system away from the centerline presser along a horizontal axis while applying the force. In some illustrative examples, applying the force to the prepreg material using a number of compliant elongate members of the shaping system comprises moving the number of compliant elongate members of the shaping system to substantially mirror a number of features of a surface of the at least one mold. In some illustrative examples, wherein applying the force to the prepreg material using a number of compliant elongate members of the shaping system comprises moving the number of compliant elongate members of the shaping system along a vertical axis relative to the centerline presser.

Figure 23:
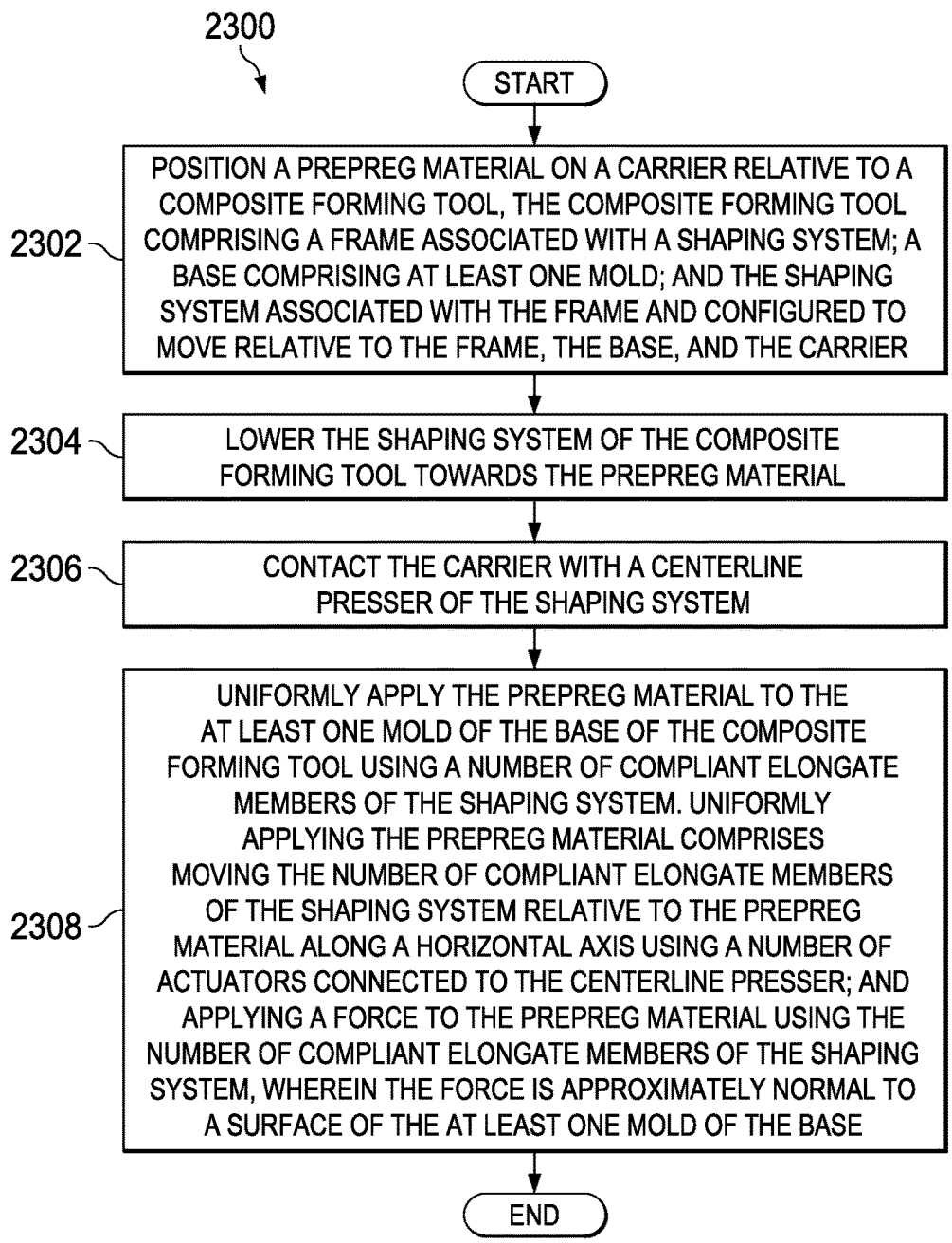
FIG. 23 is an illustration of a flowchart of a process for forming a composite part in accordance with an illustrative embodiment.

Turning now to FIG. 23, an illustration of a flowchart of a process for forming a composite part is depicted in accordance with an illustrative embodiment. Process 2300 may be used to form a composite part such as composite part 203 of FIG. 2. Process 2300 may be performed on a composite forming tool such as composite forming tool 202 of FIG. 2 or composite forming tool 302 of FIG. 3.

The method may begin by positioning a prepreg material on a carrier relative to a composite forming tool, the composite forming tool comprising a frame associated with a shaping system; a base comprising at least one mold; and the shaping system associated with the frame and configured to move relative to the frame, the base, and the carrier (operation 2302). The carrier may be carrier 208 of FIG. 2. In some illustrative embodiments, the carrier comprises a frame and a film. The prepreg material may be positioned on the film such that the prepreg material is facing the at least one mold. The carrier may be centered on the composite forming tool using an alignment feature of the carrier. The carrier may be aligned relative to a centerline of the composite forming tool.

The method then lowers the shaping system of the composite forming tool towards the prepreg material (operation 2304). The shaping system may be shaping system 232 of FIG. 2. The shaping system may include a centerline presser, a first force application assembly, and a second force application assembly. The shaping system of the composite forming tool may be lowered such that the components of the shaping system may be able to reach the carrier to shape the prepreg material.

The method may then contact the carrier with a centerline presser of the shaping system (operation 2306). In some illustrative examples, by contacting the carrier with the centerline presser, the prepreg material may contact the base. In these illustrative examples, the base may take the form of a female mold. In other illustrative examples, by contacting the carrier with the centerline presser, the prepreg material may be pushed down by the centerline presser without contacting the base. In these illustrative examples, the prepreg material may be pulled taut by contacting the carrier with the centerline presser without the prepreg material contacting the base. This illustrative example may be performed when the base takes the form of a number of male molds.

The method then uniformly applies the prepreg material to the at least one mold of the base of the composite forming tool using a number of compliant elongate members of the shaping system. Uniformly applying the prepreg material comprises moving the number of compliant elongate members of the shaping system relative to the prepreg material along a horizontal axis using a number of actuators connected to the centerline presser; and applying a force to the prepreg material using the number of compliant elongate members of the shaping system, wherein the force is approximately normal to a surface of the at least one mold of the base (operation 2308). To uniformly apply the prepreg material to the base, the force against the prepreg material must be substantially uniform as it is applied. At least one movement system controls the movement of and force applied by the number of compliant elongate members. In some illustrative examples, three types of arms may be associated with each compliant elongate member. For example, a first number of compliant elongate members may be moved by a combination of a number of vertical arms, a first number of arms, and a second number of arms.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, the method may also retract the number of compliant elongate members and move a first mold of the at least one mold of the base and a second mold of the at least one mold of the base relative to each other after retracting the number of compliant elongate members. In some illustrative examples, moving the first mold of the at least one mold of the base and the second mold of the at least one mold of the base relative to each other comprises moving the first mold and the second mold towards each other.

In some illustrative examples, the method also moves the frame and the shaping system relative to the base following uniformly applying the prepreg material to the at least one mold of the base of the composite forming tool and positions a second prepreg material relative to the composite forming tool after moving the frame and the shaping system. In some illustrative examples, the method also moves the base relative to the frame and the shaping system following uniformly applying the prepreg material to the at least one mold of the base of the composite forming tool and positions a second prepreg material relative to the composite forming tool after moving the base.

Figure 24:
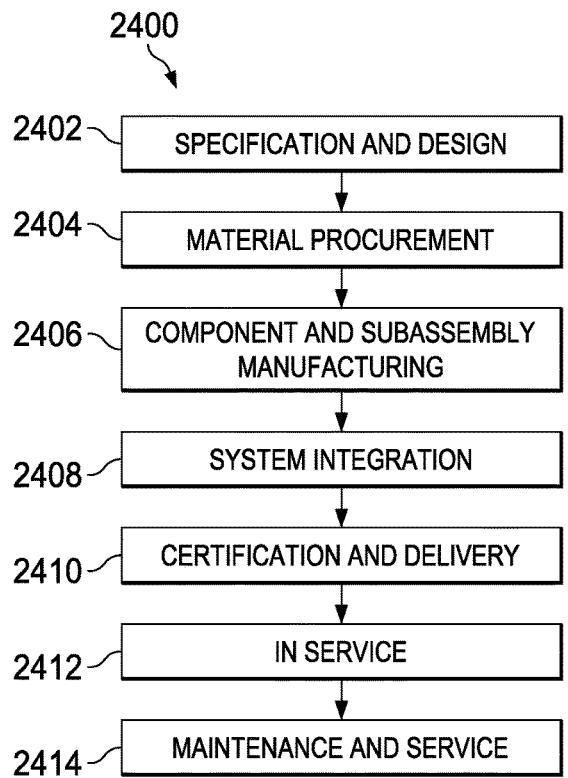
FIG. 24 is an illustration of a block diagram of an aircraft manufacturing and service method in accordance with an illustrative embodiment.
Figure 25:
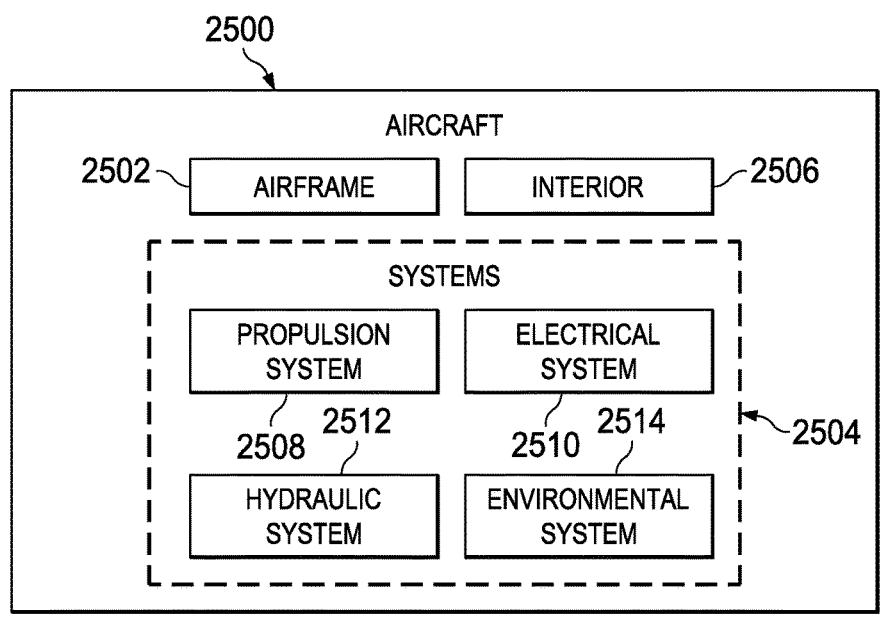
FIG. 25 is an illustration of a block diagram of an aircraft in which an illustrative embodiment may be implemented.

The illustrative embodiments of the disclosure may be described in the context of aircraft manufacturing and service method 2400 as shown in FIG. 24 and aircraft 2500 as shown in FIG. 25. Turning first to FIG. 24, an illustration of a block diagram of an aircraft manufacturing and service method is depicted in accordance with an illustrative embodiment. During pre-production, aircraft manufacturing and service method 2400 may include specification and design 2402 of aircraft 2500 in FIG. 25 and material procurement 2404.

During production, component and subassembly manufacturing 2406 and system integration 2408 of aircraft 2500 in FIG. 25 takes place. Thereafter, aircraft 2500 in FIG. 25 may go through certification and delivery 2410 in order to be placed in service 2412. While in service 2412 by a customer, aircraft 2500 in FIG. 25 is scheduled for routine maintenance and service 2414, which may include modification, reconfiguration, refurbishment, and other maintenance or service.

Each of the processes of aircraft manufacturing and service method 2400 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 25, an illustration of a block diagram of an aircraft is depicted in which an illustrative embodiment may be implemented. In this example, aircraft 2500 is produced by aircraft manufacturing and service method 2400 in FIG. 24 and may include airframe 2502 with plurality of systems 2504 and interior 2506. Examples of systems 2504 include one or more of propulsion system 2508, electrical system 2510, hydraulic system 2512, and environmental system 2514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2400 in FIG. 24. In particular, composite forming tool 202 and composite part 203 from FIG. 2 may be used during any one of the stages of aircraft manufacturing and service method 2400. For example, without limitation, composite forming tool 202 from FIG. 2 may be used to produce composite part 203 during at least one of component and subassembly manufacturing 2406, system integration 2408, routine maintenance and service 2414, or some other stage of aircraft manufacturing and service method 2400.

In one illustrative example, components or subassemblies produced in component and subassembly manufacturing 2406 in FIG. 24 may be fabricated or manufactured in a manner similar to components or subassemblies produced while aircraft 2500 is in service 2412 in FIG. 24. As yet another example, one or more apparatus embodiments, method embodiments, or a combination thereof may be utilized during production stages, such as component and subassembly manufacturing 2406 and system integration 2408 in FIG. 24. One or more apparatus embodiments, method embodiments, or a combination thereof may be utilized while aircraft 2500 is in service 2412, during maintenance and service 2414 in FIG. 24, or a combination thereof. The use of a number of the different illustrative embodiments may substantially expedite the assembly, reduce the cost of aircraft 2500, or both.

The illustrative embodiments provide a method and apparatus for a technical solution to at least one of forming a composite part using manual layup of the composite part or using currently available composite part layup systems. The method and apparatus enable automation of a process previously performed by hand. The apparatus enables automation by applying substantially uniform force to a prepreg material as a number of compliant elongate forming members moves across the prepreg material. The number of compliant elongate forming members may sweep outward from a centerline presser to apply the prepreg material.

A number of arms move and provide the force to the number of compliant elongate forming members. Composite forming tool 202 may form composite parts having a variety of shapes. Further, composite forming tool 202 may form female composite parts having desirable quality on female molds.

Yet further, composite forming tool 202 has a relatively small footprint in a manufacturing environment. Composite forming tool 202 may reduce at least one of manufacturing time, manufacturing cost, or inconsistencies for forming a composite part such as stringer 204 of FIG. 2.

The method comprises positioning a prepreg material relative to a composite forming tool. The composite forming tool comprises a frame associated with a shaping system, a base comprising at least one mold, and the shaping system associated with the frame and configured to move relative to the frame, the base, and the prepreg material. The method also lowers the shaping system of the composite forming tool towards the prepreg material. The method applies pressure to the prepreg material with a centerline presser of the shaping system. The method also applies a force to the prepreg material using a number of compliant elongate members of the shaping system to uniformly apply the prepreg material to the at least one mold of a base of the composite forming tool.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for forming a composite part comprising:
   positioning a prepreg material over at least one mold having a center and bottom, the at least one mold being part of a composite forming tool, the composite forming tool comprising:
   a frame associated with a shaping system, the shaping system including:
   a centerline presser;
   at least two compliant elongate members, each one of the at least two compliant elongate members being on a side of the centerline presser; and a base comprising the at least one mold;
applying pressure to the prepreg material with the centerline presser of the shaping system such that the prepreg material is tacked to the bottom and center of the mold; and
applying a lateral force to the prepreg material relative to the centerline presser using the at least two compliant elongate members of the shaping system by having each one of the at least two compliant elongate members sweep laterally over the prepreg material from the centerline presser to an end of the at least one mold to uniformly apply the prepreg material to the at least one mold.

2. The method of claim 1, wherein applying the lateral force to the prepreg material using the at least two compliant elongate members of the shaping system comprises moving the at least two compliant elongate members of the shaping system away from the centerline presser along a horizontal axis while applying the lateral force.

3. The method of claim 1, wherein applying the lateral force to the prepreg material using the at least two compliant elongate members of the shaping system comprises:
moving the at least two compliant elongate members of the shaping system to mirror a number of features of a surface of the at least one mold.

4. The method of claim 1, wherein applying the lateral force to the prepreg material using the at least two compliant elongate members of the shaping system comprises:
moving the at least two compliant elongate members of the shaping system along a vertical axis relative to the centerline presser.

5. The method of claim 1 further comprising:
retracting the at least two compliant elongate members; and
moving a first mold of the at least one mold of the base and a second mold of the at least one mold of the base relative to each other after retracting the at least two compliant elongate members.

6. The method of claim 5, wherein moving the first mold of the at least one mold of the base and the second mold of the at least one mold of the base relative to each other comprises:
moving the first mold and the second mold towards each other.

7. The method of claim 1 further comprising:
moving the frame and the shaping system relative to the base following uniformly applying the prepreg material to the at least one mold of the base of the composite forming tool; and
positioning a second prepreg material relative to the composite forming tool after moving the frame and the shaping system.

8. The method of claim 1 further comprising:
moving the base relative to the frame and the shaping system following uniformly applying the prepreg material to the at least one mold of the base of the composite forming tool; and
positioning a second prepreg material relative to the composite forming tool after moving the base.

9. The method of claim 1, wherein applying the lateral force to the prepreg material using the at least two compliant elongate members of the shaping system comprises:
moving a first compliant elongate member and a second compliant elongate member of the at least two compliant elongate members in paths which are mirror images of each other.

10. The method of claim 1, wherein applying the lateral force to the prepreg material using the at least two compliant elongate members of the shaping system comprises:
moving the at least two compliant elongate members simultaneously.

11. The method of claim 1, wherein applying the pressure to the prepreg material includes:
contacting a carrier holding the prepreg material with the centerline presser of the shaping system.

12. The method of claim 1, wherein uniformly applying the prepreg material to the at least one mold of the base of the composite forming tool comprises:
controlling the lateral force applied by the at least two compliant elongate members such that the prepreg material is uniformly tacked to the at least one mold.

13. The method of claim 1, wherein uniformly applying the prepreg material to the at least one mold of the base of the composite forming tool comprises:
controlling the lateral force applied by a first compliant elongate member in the at least two compliant elongate members using a first actuator; and
controlling a position and angle of the first compliant elongate member in the at least two compliant elongate members using a number of actuators.

14. A method for forming a composite part comprising:
positioning a prepreg material on a carrier relative to a composite forming tool, the composite forming tool comprising:
a frame associated with a shaping system; and
a base comprising at least one mold having a bottom and a center, wherein the shaping system associated with the frame is configured to move relative to the frame, the base, and the carrier;
lowering the shaping system of the composite forming tool towards the prepreg material;
pressing the prepreg material against the bottom and center of the mold using a centerline presser of the shaping system; and
uniformly applying the prepreg material to the at least one mold of the base of the composite forming tool using a number of compliant elongate members of the shaping system, wherein uniformly applying the prepreg material comprises:
moving the number of compliant elongate members of the shaping system laterally relative to the centerline presser over the prepreg material; and
applying a force to the prepreg material using the number of compliant elongate members of the shaping system while moving the number of compliant elongate members laterally over the prepreg material, wherein the force is approximately normal to a surface of the at least one mold of the base.

15. A method of forming a composite part comprising:
positioning a prepreg material over a mold having a shape, center and bottom, the mold being part of a composite forming tool, the composite forming tool comprising:
a centerline presser;
at least two compliant elongate members, each one of the at least two compliant elongate members being on a side of the centerline presser; and
a base comprising the mold;
applying pressure to the prepreg material with the centerline presser such that the prepreg material is tacked to the bottom and center of the mold; and
applying a lateral force to the prepreg material relative to the centerline presser by having each one of the at least two compliant elongate members sweep laterally over the prepreg material from the centerline presser to an end of the mold such that the prepreg material takes on the shape of the mold.

16. The method of claim 1 further comprising:
pulling the prepreg material taut by contacting a carrier holding the prepreg material with the centerline presser without the prepreg material contacting the base.

17. The method of claim 1, wherein three types of arms are associated with each compliant elongate member.

18. The method of claim 1, wherein applying a lateral force to the prepreg material relative to the centerline presser using the at least two compliant elongate members comprises moving a first number of compliant elongate members by a combination of a number of vertical arms, a first number of arms, and a second number of arms.

19. The method of claim 1, wherein positioning the prepreg material over at least one mold having a center and bottom comprises centering a carrier holding the prepreg material on the composite forming tool using an alignment feature of the carrier.

20. The method of claim 14, wherein positioning the prepreg material on the carrier relative to the composite forming tool comprises centering the carrier on the composite forming tool using an alignment feature of the carrier.

\* \* \* \* \*

UNITED STATES PATENT AND TRADEMARK OFFICE
CERTIFICATE OF CORRECTION

PATENT NO. : 10,011,080 B2
APPLICATION NO. : 14/500667
DATED : July 3, 2018
INVENTOR(S) : Studley et al.

Page 1 of 1

It is certified that error appears in the above-identified patent and that said Letters Patent is hereby corrected as shown below:

In the Claims

Column 23, Line 11, change "a lateral force" to --the lateral force--

Signed and Sealed this
Sixteenth Day of October, 2018

Andrei Iancu
*Director of the United States Patent and Trademark Office*